(12) United States Patent
Koyano

(10) Patent No.: US 10,186,021 B2
(45) Date of Patent: Jan. 22, 2019

(54) CAMERA SYSTEM, CAMERA BODY, AND CONTROL METHOD OF CAMERA SYSTEM

(71) Applicant: OLYMPUS CORPORATION, Hachioji-shi, Tokyo (JP)

(72) Inventor: Kento Koyano, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/491,668

(22) Filed: Apr. 19, 2017

(65) Prior Publication Data

US 2017/0309002 A1 Oct. 26, 2017

(30) Foreign Application Priority Data

Apr. 20, 2016 (JP) ................. 2016-084739

(51) Int. Cl.
| | |
|---|---|
| G06T 5/00 | (2006.01) |
| G02B 7/09 | (2006.01) |
| G02B 7/14 | (2006.01) |
| H04N 5/225 | (2006.01) |
| H04N 5/232 | (2006.01) |
| G02B 27/64 | (2006.01) |
| G03B 17/14 | (2006.01) |
| H04N 5/217 | (2011.01) |

(52) U.S. Cl.
CPC ............. *G06T 5/006* (2013.01); *G02B 7/09* (2013.01); *G02B 7/14* (2013.01); *G02B 27/646* (2013.01); *G03B 17/14* (2013.01); *H04N 5/217* (2013.01); *H04N 5/2252* (2013.01); *H04N 5/2254* (2013.01); *H04N 5/23254* (2013.01); *H04N 5/23287* (2013.01); *G03B 2205/0015* (2013.01); *G03B 2217/005* (2013.01)

(58) Field of Classification Search
CPC .. G06T 5/006; G02B 7/09; G02B 7/14; G02B 27/646; G03B 17/14; H04N 5/217; H04N 5/2252; H04N 5/2254; H04N 5/23254; H04N 5/23287
See application file for complete search history.

(56) References Cited

U.S. PATENT DOCUMENTS

2016/0073005 A1* 3/2016 Sugita ................ H04N 5/23212
348/349
2016/0261806 A1* 9/2016 Honjo ................ H04N 5/23209

FOREIGN PATENT DOCUMENTS

JP 2015015587 A 1/2015

* cited by examiner

*Primary Examiner* — Twyler L Haskins
*Assistant Examiner* — Fayez Bhuiyan
(74) *Attorney, Agent, or Firm* — Volpe and Koenig, P.C.

(57) ABSTRACT

According to one embodiment, camera system includes interchangeable lens and camera body. Camera body includes image sensor; reception circuit configured to acquire, first lens information including distortion correction information for correcting distortion of image pickup optical system, and function indicating correlation between shape of distortion on image plane, which corresponds to driving amount of vibration reduction optical system, and shape of distortion on image plane, which corresponds to displacement amount between optical axis and image center of photographed image; and processer configured to calculate converted displacement amount by using function, and to execute distortion correction, based on distortion correction information and converted displacement amount.

16 Claims, 15 Drawing Sheets

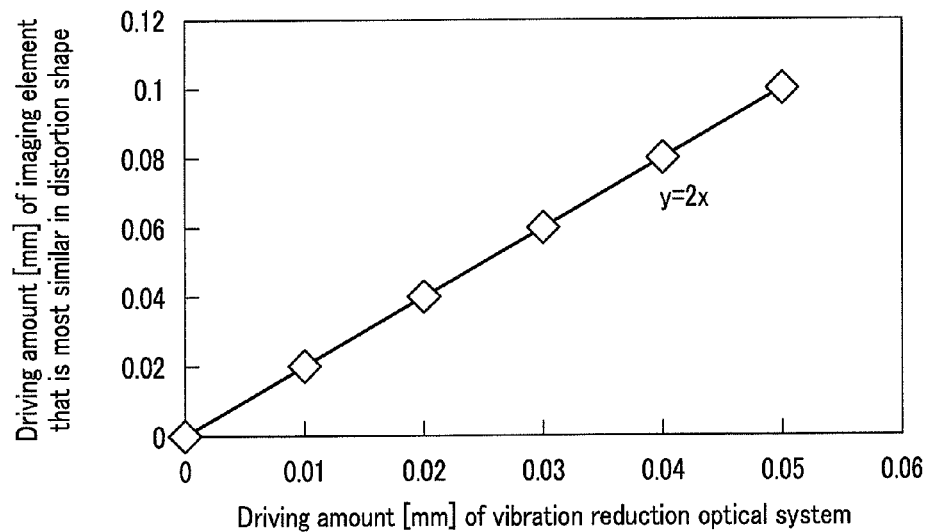
F I G. 6A
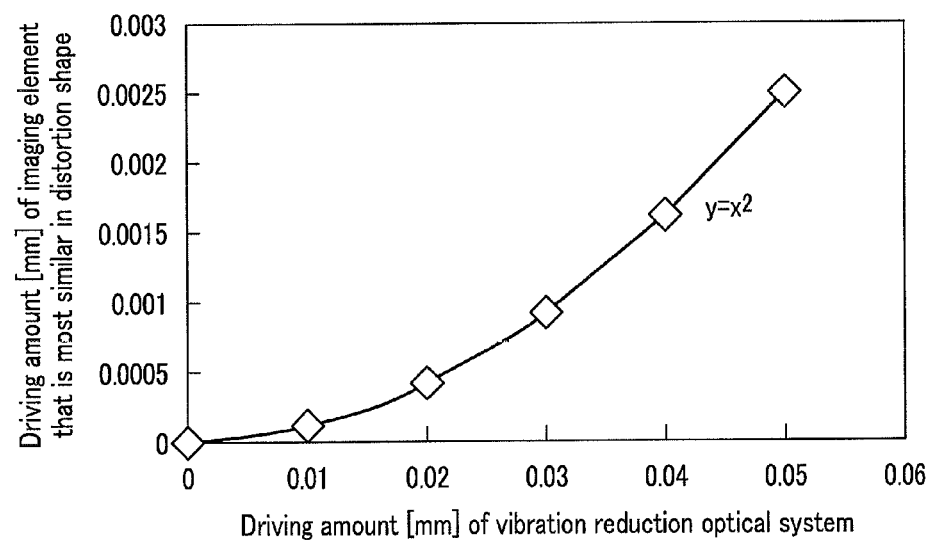
F I G. 6B

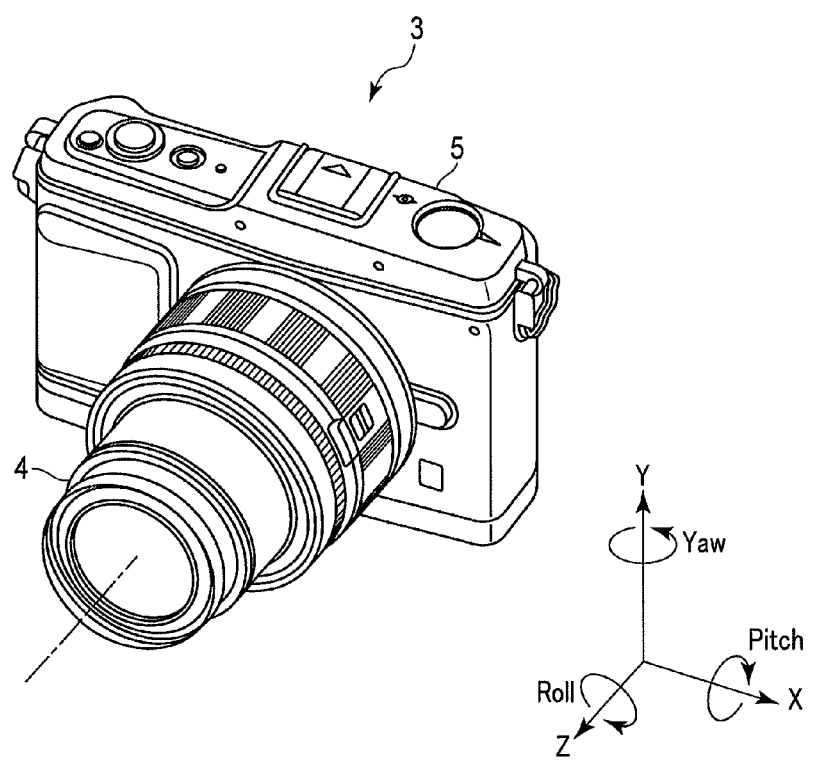
F I G. 7

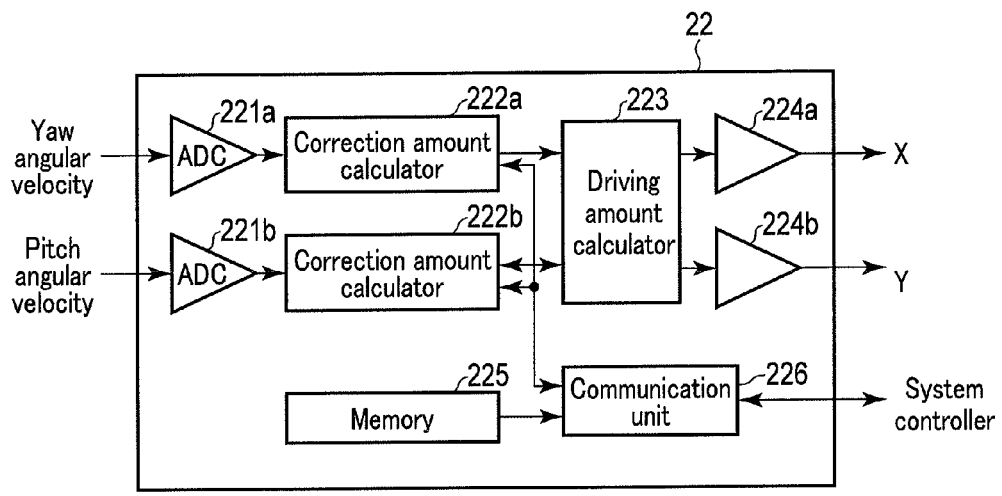
F I G. 11
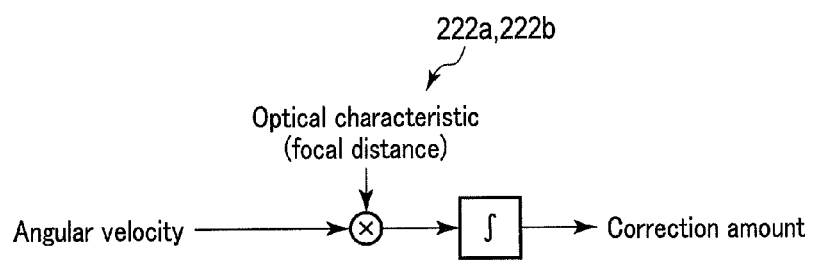
F I G. 12

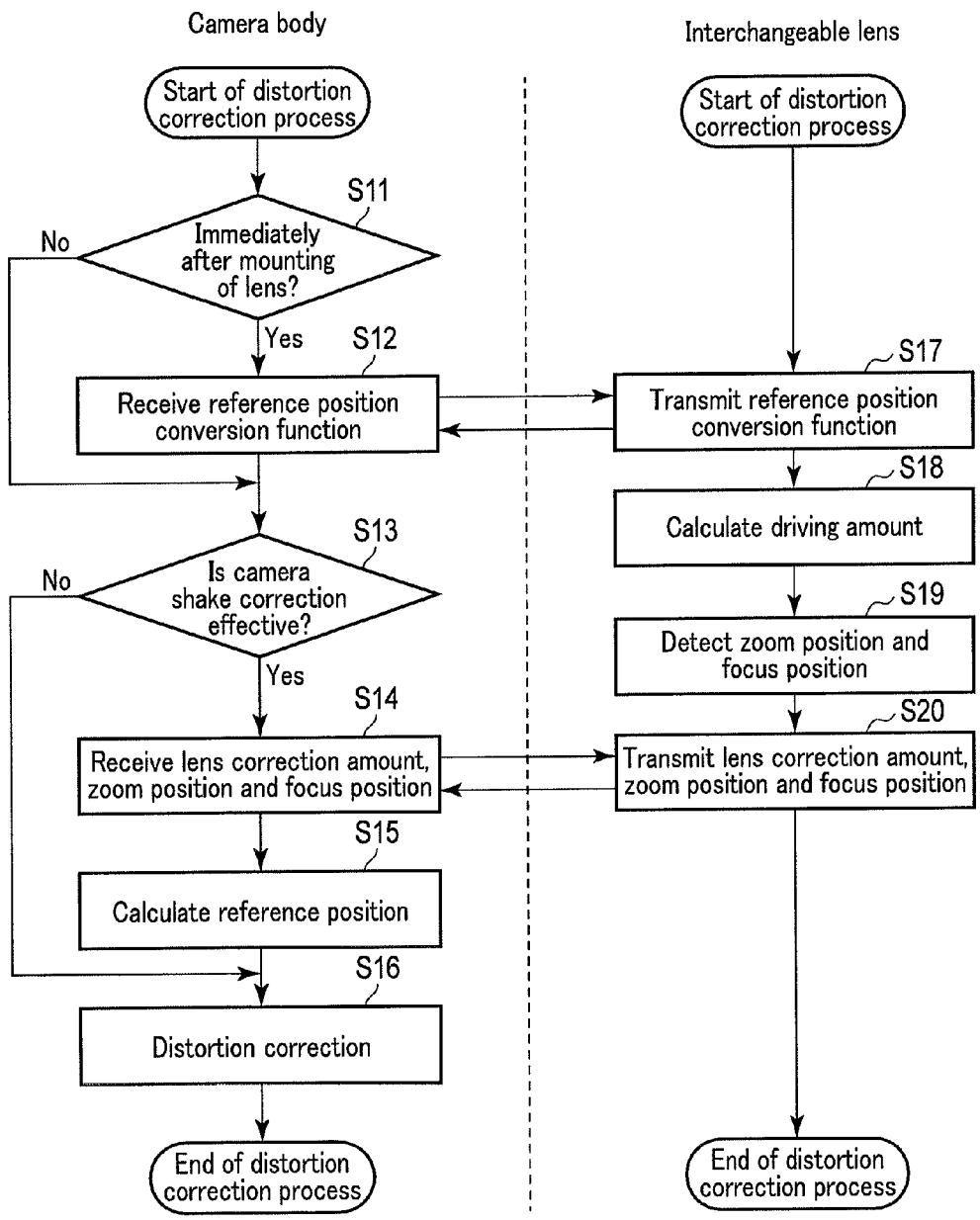
F I G. 13

| | | Zoom position | | | | | | | |
|---|---|---|---|---|---|---|---|---|---|
| | | 1 | 2 | 3 | 4 | ...... | 14 | 15 | 16 |
| Focus position | 1 | $\alpha_{1\_1}$ | $\alpha_{1\_2}$ | $\alpha_{1\_3}$ | $\alpha_{1\_4}$ | ...... | $\alpha_{1\_14}$ | $\alpha_{1\_15}$ | $\alpha_{1\_16}$ |
| | 2 | $\alpha_{2\_1}$ | $\alpha_{2\_2}$ | $\alpha_{2\_3}$ | $\alpha_{2\_4}$ | ...... | $\alpha_{2\_14}$ | $\alpha_{2\_15}$ | $\alpha_{2\_16}$ |
| | 3 | $\alpha_{3\_1}$ | $\alpha_{3\_2}$ | $\alpha_{3\_3}$ | $\alpha_{3\_4}$ | ...... | $\alpha_{3\_14}$ | $\alpha_{3\_15}$ | $\alpha_{3\_16}$ |
| | 4 | $\alpha_{4\_1}$ | $\alpha_{4\_2}$ | $\alpha_{4\_3}$ | $\alpha_{4\_4}$ | ...... | $\alpha_{4\_14}$ | $\alpha_{4\_15}$ | $\alpha_{4\_16}$ |

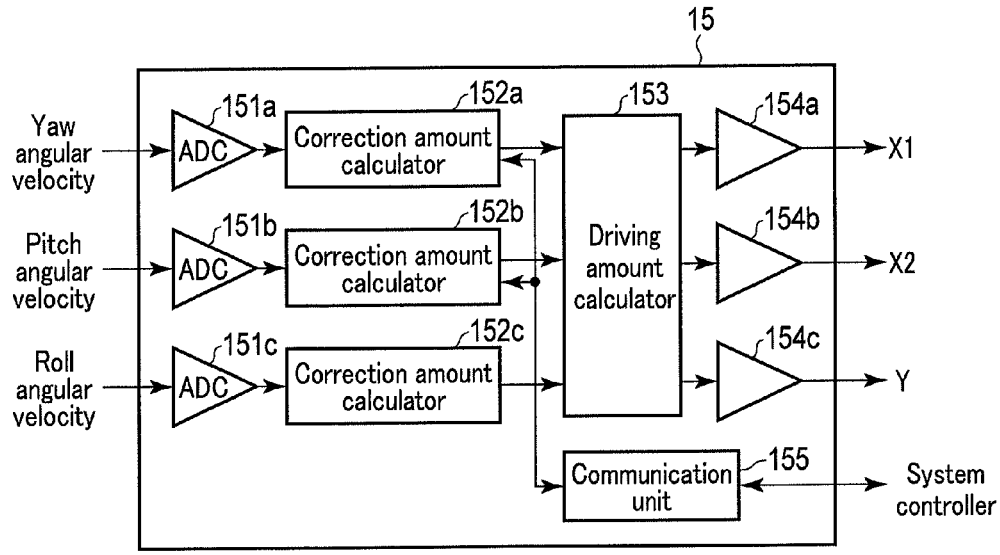
F I G. 16
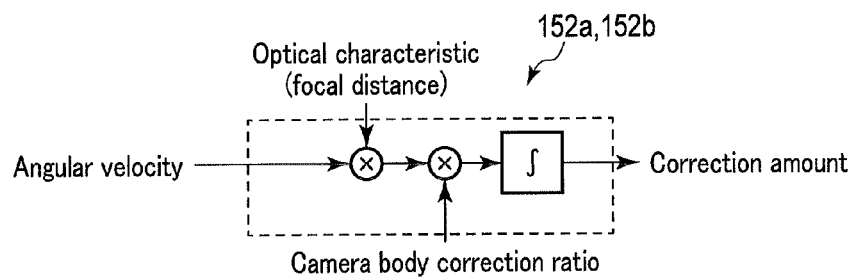
F I G. 17
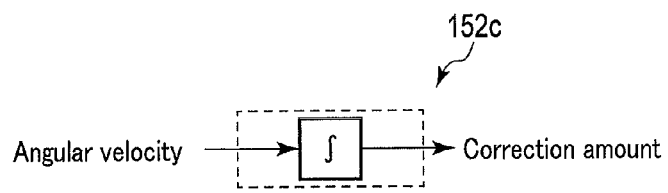
F I G. 18

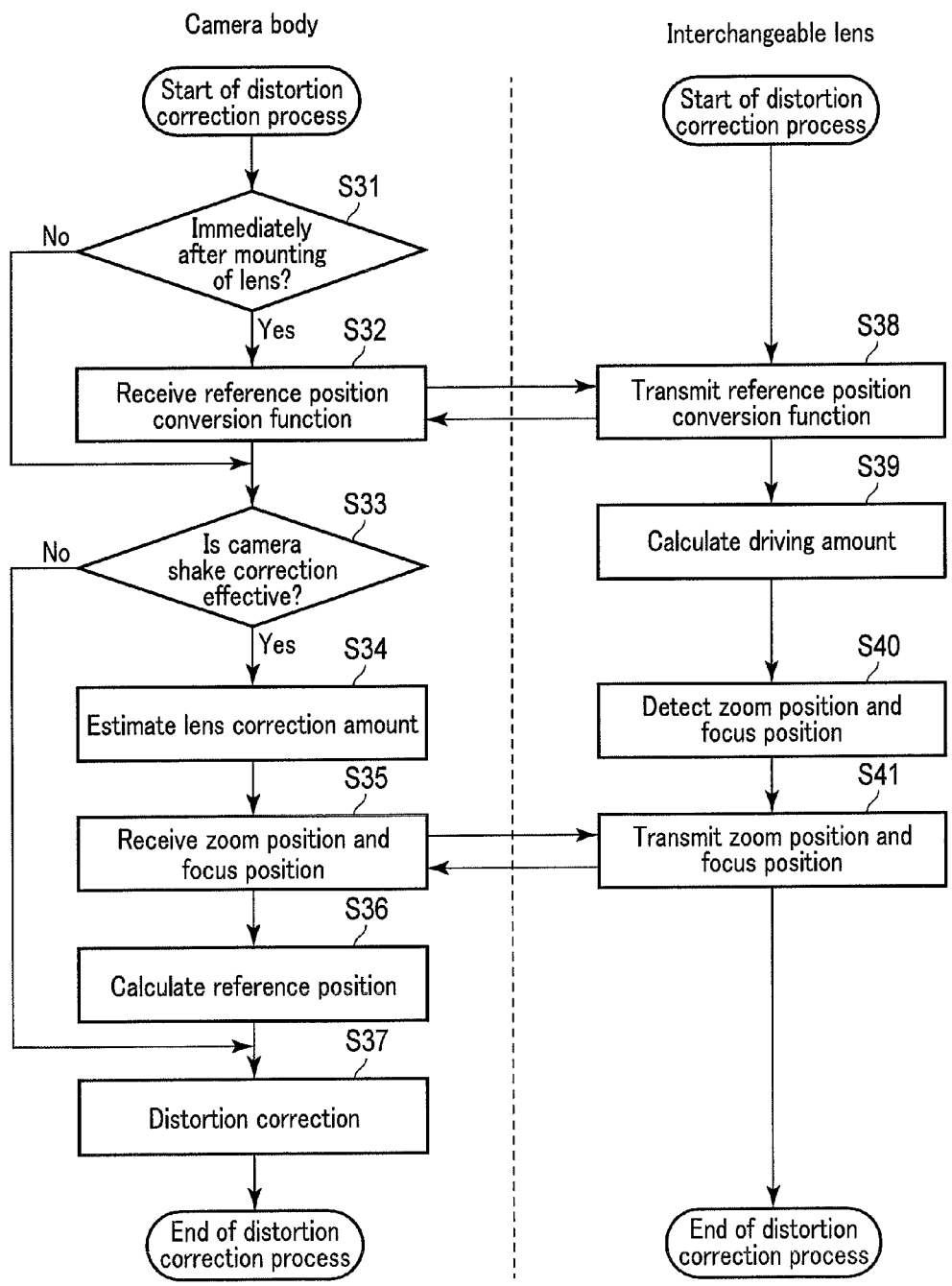
F I G. 22

CAMERA SYSTEM, CAMERA BODY, AND CONTROL METHOD OF CAMERA SYSTEM

CROSS-REFERENCE TO RELATED APPLICATIONS

This application is based upon and claims the benefit of priority from the prior Japanese Patent Application No. 2016-084739, filed Apr. 20, 2016, the entire contents of which are incorporated herein by reference.

FIELD

The present invention relates to a camera system, a camera body, and a control method of the camera system.

BACKGROUND

As a method for suppressing blur (image blur) in a photographed image due to a camera shake or the like in an image pickup apparatus, there is known an optical-type blur suppressing process which drives a vibration reduction optical system in accordance with blur that occurred, the vibration reduction optical system being provided to constitute a part of an image pickup optical system. In addition, a photographed image, which is obtained via the image pickup optical system, distorts due to an influence of distortion or the like of the image pickup optical system. Such distortion or the like is, in usual cases, corrected by a geometrical conversion process. In an image pickup apparatus which is proposed in Jpn. Pat. Appln. KOKAI Publication No. 2015-015587 (patent document 1), a component (dynamic component), which varies due to decentering of the image pickup optical system by the driving of the vibration reduction optical system, and a component (static component), which does not vary, are divided, and the distortions of the respective components are individually corrected, thereby to improve the precision of distortion correction.

However, in the method of patent document 1, since two distortion corrections are executed, the processing load increases. In addition, since parameters for correction, which are used in the respective distortion corrections, are needed, a necessary memory resource increases.

SUMMARY

According to one embodiment, a camera system includes an interchangeable lens and a camera body on which the interchangeable lens is mounted. The interchangeable lens includes an image pickup optical system including at least a vibration reduction optical system which is driven in a direction perpendicular to an optical axis, the image pickup optical system being configured to form an image on an image plane; a blur amount detection sensor configured to acquire a blur amount of the camera system; and a blur correction actuator configured to drive the vibration reduction optical system by a driving amount corresponding to the blur amount. The camera body includes an image sensor configured to photograph the image formed by the image pickup optical system, and to acquire a photographed image; a reception circuit configured to acquire first lens information including distortion correction information for correcting distortion of the image pickup optical system, and a function indicating a correlation between a shape of distortion on the image plane, which corresponds to a driving amount of the vibration reduction optical system, and a shape of distortion on the image plane, which corresponds to a displacement amount between the optical axis and an image center of the photographed image; and a processor configured to convert the displacement amount between the optical axis and the image center of the photographed image by using the function, thereby calculating a converted displacement amount, and to execute distortion correction on the photographed image, based on the distortion correction information and the converted displacement amount.

According to the present invention, there can be provided a camera system and a camera body, which can execute, by a simple method, distortion correction with high precision, taking into account a shape variation of distortion on an image plane due to decentering of a vibration reduction optical system.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6A is a view illustrating an example of a correlation between a driving amount of a vibration reduction optical system and a driving amount of an imaging element, which are similar in shape of distortion on an image plane.

FIG. 6B is a view illustrating an example of a correlation between a driving amount of a vibration reduction optical system and a driving amount of an imaging element, which are similar in shape of distortion on an image plane.

FIG. 7 is a view illustrating an external appearance of an interchangeable lens and a camera body of an image pickup system according to a first embodiment.

FIG. 11 is a block diagram illustrating, as blocks, functions which an LCU includes.

FIG. 12 is an explanatory view for explaining an operation of a correction amount calculator.

FIG. 13 is a flowchart illustrating an example of an operation relating to distortion correction of a camera body and an interchangeable lens.

FIG. 16 is a block diagram illustrating, as blocks, functions which a blur correction microcomputer includes.

FIG. 17 is an explanatory view for explaining an operation of a correction amount calculator.

FIG. 18 is an explanatory view for explaining an operation of a correction amount calculator.

FIG. 22 is a flowchart illustrating an example of an operation relating to distortion correction of a camera body and an interchangeable lens according to the second embodiment.

DETAILED DESCRIPTION

Figure 1A:
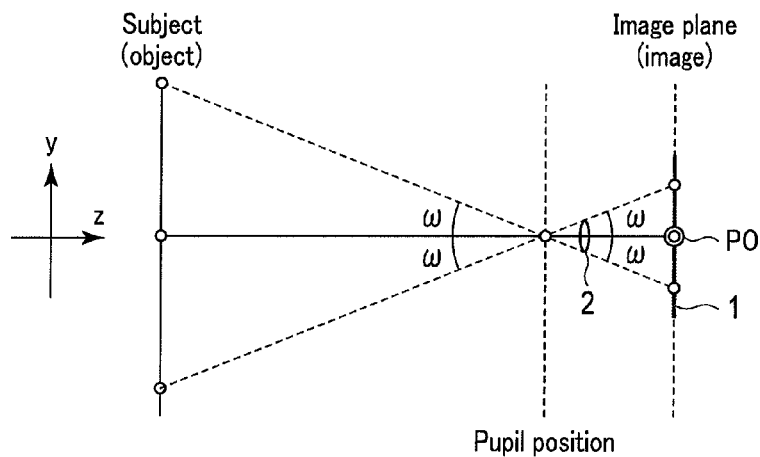
FIG. 1A is a view for explaining image blur.
Figure 1B:
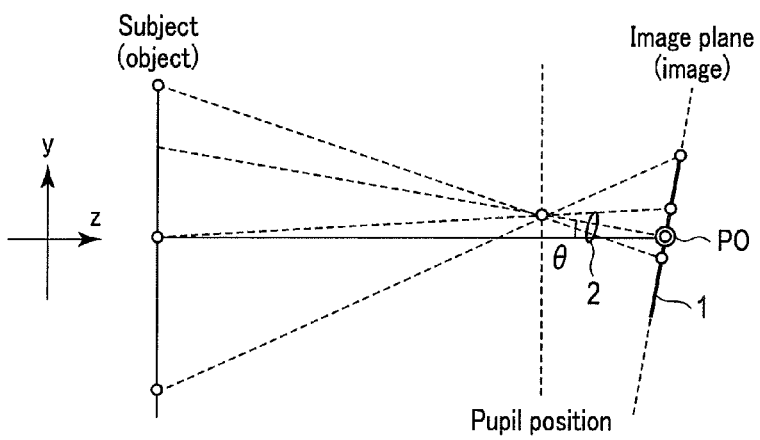
FIG. 1B is a view for explaining image blur.

Hereinafter, embodiments of the present invention will be described with reference to the accompanying drawings. To begin with, the principle of distortion correction according to each of the embodiments of the invention is explained. Thus, an image blur suppression process (vibration reduction process) is explained. FIG. 1A and FIG. 1B are views for describing image blur. FIG. 1A is a view illustrating a relationship between a subject and an image pickup apparatus at a time when no image blur occurs. FIG. 1B is a view illustrating a relationship between the subject and image pickup apparatus at a time when angular blur of angle θ occurs at an image center of the image pickup apparatus. A z-axis in FIG. 1A and FIG. 1B is, for example, a direction which is parallel to the ground surface, and a y-axis is, for example, a direction which is perpendicular to the ground surface.

A light flux from an arbitrary object point of a subject forms an image at a pupil position, and then the light flux passes through a vibration reduction optical system 2 and forms an image once again on an image plane of an imaging element 1. Both the incidence angle and the exit angle of the light flux are ω. Here, the direction of a light ray, which passes, in a direction perpendicular to a principal plane, through a principal point in a case in which an image pickup optical system is regard as a single lens (composite lens), is defined as an optical axis of the image pickup optical system. In addition, in FIG. 1A and FIG. 1B, it is assumed that the optical axis of the image pickup optical system agrees with the optical axis of the vibration reduction optical system 2. In this case, as illustrated in FIG. 1A, when no blur occurs in the image pickup apparatus, a y-axis position of the optical axis at the pupil position of the image pickup optical system agrees with a y-axis position of an image plane center (which agrees with an image center) of the imaging element 1. Accordingly, light (principal light ray), which passes through the optical axis of the image pickup optical system, is incident on the image plane center PO of the imaging element 1 through the optical axis of the vibration reduction optical system 2. On the other hand, as illustrated in FIG. 1B, if image blur of angle θ occurs in the image pickup apparatus, a displacement occurs between the y-axis position of the optical axis at the pupil position of the image pickup optical system and the y-axis position of the image plane center of the imaging element 1. Due to the magnitude of this displacement, the light flux, which radiates from an identical object point of the subject, forms an image at an image-formation position on the imaging element 1, which is different from the image-formation position at the time when no blur occurs. Image blur occurs due to this displacement of the image-formation position. In the meantime, such image blur occurs not only due to an angular shake, but also due to a shift shake by which the image pickup apparatus shifts in a direction parallel to the image plane.

Figure 2A:
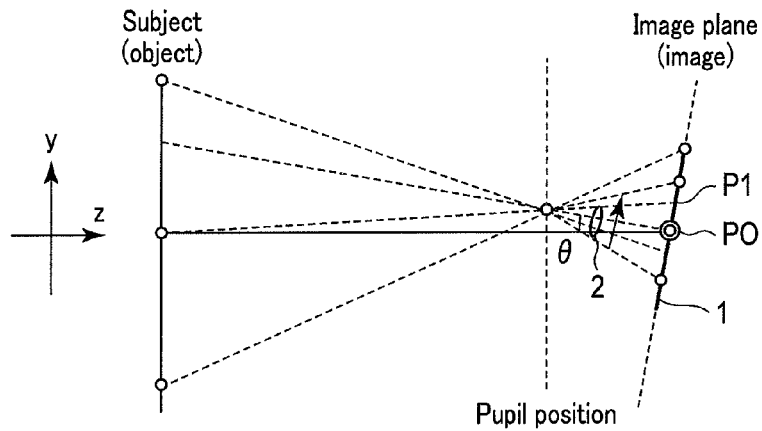
FIG. 2A is a view for explaining an optical system shift-type blur suppression process.
Figure 2B:
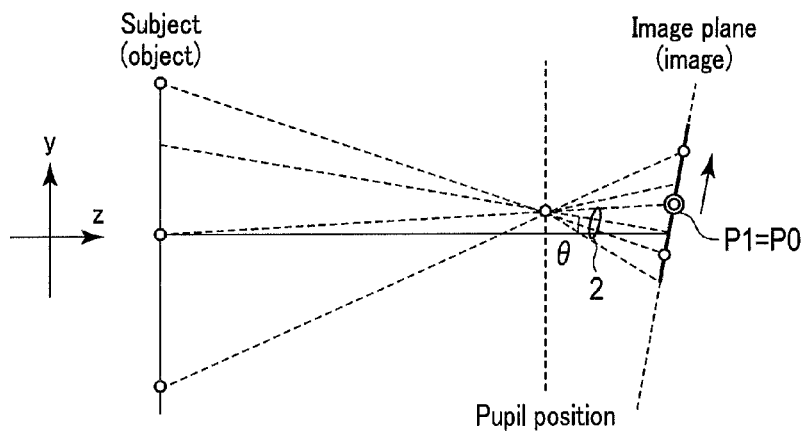
FIG. 2B is a view for explaining an imaging element shift-type blur suppression process.
Figure 2C:
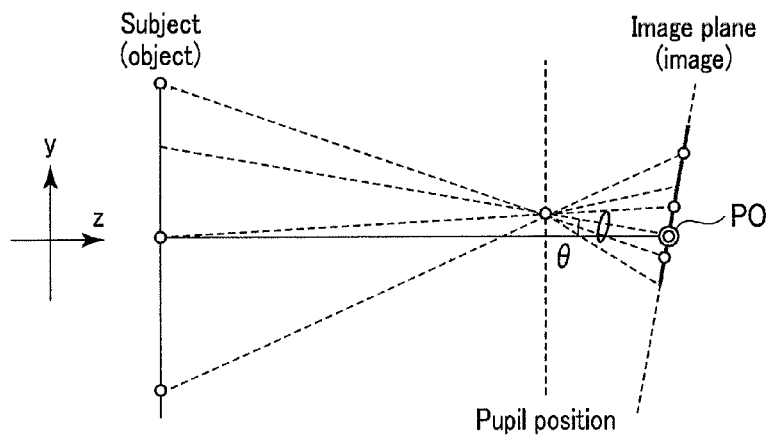
FIG. 2C is a view for explaining an electronic-type blur suppression process.

Blur suppression methods for suppressing image blur are mainly classified into an optical system shift type, an imaging element shift type, and an electronic type. As illustrated in FIG. 2A, the optical system shift-type blur suppression process is a process of suppressing blur by driving the vibration reduction optical system 2, which is a part of the image pickup optical system, in a plane perpendicular to the optical axis of the image pickup optical system in accordance with a detected blur. Specifically, in the optical system shift-type blur suppression process, the image-formation position of the light flux is moved to P1, without the image plane center PO being moved. As illustrated in FIG. 2B, the imaging element shift-type blur suppression process is a process of suppressing blur by driving the imaging element 1 in the plane perpendicular to the optical axis of the image pickup optical system in accordance with the detected blur. Specifically, in the imaging element shift-type blur suppression process, the image plane center PO is moved to P1. The electronic-type blur suppression process is a process of suppressing blur by changing a cropping range of a photographed image (in the plane perpendicular to the optical axis) in accordance with the detected blur. Specifically, in the electronic-type blur suppression process, as illustrated in FIG. 2C, only the cropping range of the photographed image is changed, without the image plane center PO or image-formation position being moved.

Figure 3C:
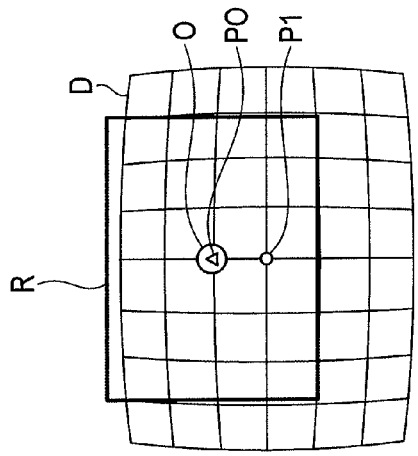
FIG. 3C is a view illustrating a photographed image after the imaging element shift-type blur suppression process or electronic-type blur suppression process was applied to the image blur of FIG. 3B.
Figure 3B:
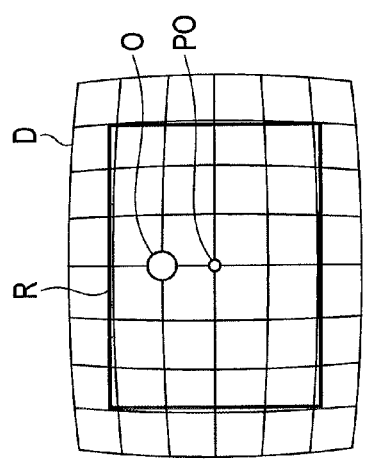
FIG. 3B is a view illustrating a photographed image in which image blur occurs.
Figure 3A:
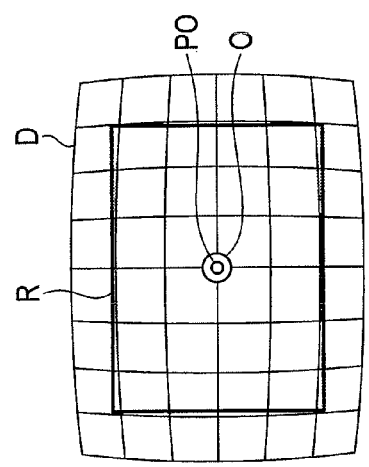
FIG. 3A is a view illustrating a photographed image in which no image blur occurs.

FIG. 3A illustrates a photographed image in which no image blur occurs. If the optical axis of the image pickup optical system is aligned with the subject, the position of the subject O on the image plane agrees with the position of the image center PO when no blur occurs. In addition, an intersection position between the optical axis of the image pickup optical system and the image plane agrees with the image center PO. In the case of either barrel distortion or pincushion distortion, the distortion occurs in point-symmetry with respect to the optical axis of the image pickup optical system as the center of symmetry. Accordingly, in the case of FIG. 3A, distortion D, which affects a photographed image, has a point-symmetric shape with respect to the image center PO as the center of symmetry.

FIG. 3B illustrates a photographed image in which image blur occurs. Since the optical axis of the image pickup optical system deviates from the subject due to a shake of the image pickup apparatus, the position of the subject O on the image plane moves from the position of the image center PO. On the other hand, when the blur suppression process is not executed, the intersection position between the optical axis of the image pickup optical system and the image plane agrees with the image center PO. Accordingly, in the case of FIG. 3B, distortion D, which affects a photographed image, has a point-symmetric shape with respect to the image center PO as the center of symmetry.

FIG. 3B is a view illustrating the photographed image in which image blur occurs, and FIG. 3C illustrates a photographed image after the imaging element shift-type or electronic-type blur suppression process was applied to the image blur of FIG. 3B. By the blur suppression process, the image center PO is aligned with the position of the subject O. On the other hand, the intersection position P1 between the optical axis of the image pickup optical system and the image plane deviates from the image center PO. Accordingly, in the case of FIG. 3C, distortion D, which affects a photographed image, has a non-point-symmetric shape. If the distortion D of FIG. 3C and the distortion D of FIG. 3A and FIG. 3B are compared, the shape of the distortion D of FIG. 3C appears as if the shape was deformed by the blur suppression process.

Figure 4:
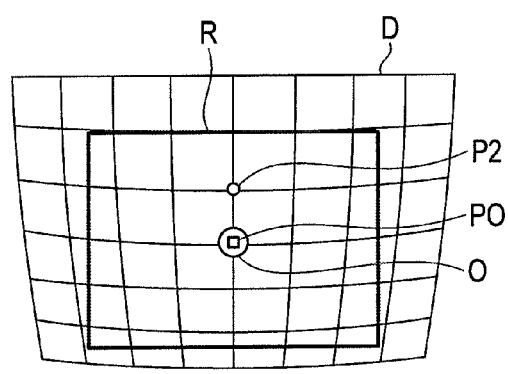
FIG. 4 is a view illustrating a photographed image after the optical system shift-type blur suppression process was applied to the image blur of FIG. 3B.

On the other hand, FIG. 4 illustrates a photographed image after the optical system shift-type blur suppression process was applied to the image blur of FIG. 3B. As illustrated in FIG. 4, in the case of the optical system shift-type blur suppression process, the position PO, which is the intersection between the light ray passing through the optical axis of the image pickup optical system 21 and the image plane, is aligned with the position of the subject O. As described above, the distortion occurs in point-symmetry with respect to the optical axis of the image pickup optical system as the center of symmetry. Thus, the distortion D, which occurred, prior to the blur suppression process, in point-symmetry with respect to an intersection P2 as the center of symmetry between the optical axis of the image pickup optical system 21 and the image plane before the driving of the vibration reduction optical system 2, will occur in non-point symmetry with respect to the intersection PO as the center of symmetry between the light (principal light ray) passing through the optical axis of the image pickup optical system 21 and the image plane after the driving of the vibration reduction optical system 2. If the distortion D of FIG. 4 and the distortion D of FIG. 3A or FIG. 3B are compared, the shape of the distortion D of FIG. 4 appears as if the shape was deformed by the blur suppression process.

As a method for exactly correcting the shape variation of the distortion due to the blur suppression process, a method is thinkable, which corrects distortion by taking into account a variation of the shape of the distortion. In normal distortion correction, the relationship between an ideal image height Y (image height after correction) and an actual image height Y' (image height before correction) is predefined as information (distortion correction information) for correcting distortion. This relationship is defined by, for example, an approximate polynomial expression such as equation (1) below. In addition, in the actual process, distortion correction is executed by coordinate conversion using the predefined relationship. Specifically, corresponding coordinates between an image before correction and an image after correction are calculated by using the definitional equation, and correction is made by rearranging the pixels in the image before correction in accordance with the corresponding coordinates.

$$Y = D0 + D1Y' + D2Y'^2 + D2Y'^3 + \quad \text{equation (1)}$$

In the distortion correction on the photographed image after the imaging element shift-type or electronic-type blur suppression process, it is possible to execute correction including correction of a change in distortion shape by usual distortion correction, in which a displacement amount between the image center and the optical axis of the image pickup optical system is taken into account. Specifically, distortion correction is executed by using the above equation (1), with the pixel position in the image, which corresponds to the optical axis of the image pickup optical system, being set as a reference position.

On the other hand, since a shape variation of distortion due to decentering of the vibration reduction optical system and a shape variation of distortion due to a displacement between the image center and the optical axis of the image pickup optical system are different in the principle of occurrence, uncorrected distortion remains even if usual distortion correction is executed by taking into account a displacement amount between the image center and the optical axis of the image pickup optical system.

Figure 5:
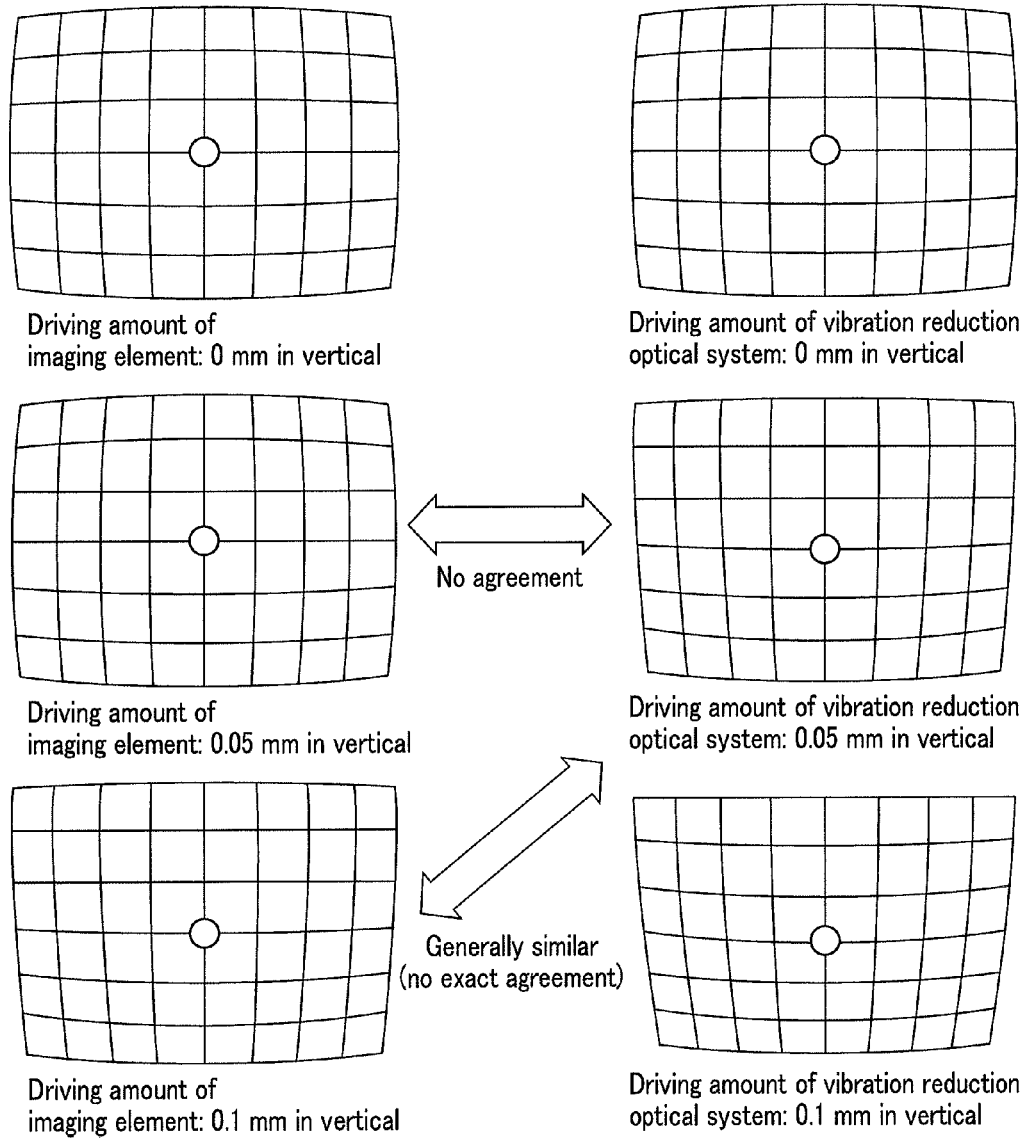
FIG. 5 is a view illustrating an example of a relationship between a shape variation of distortion due to decentering of a vibration reduction optical system and a shape variation of distortion due to a displacement between an image center and an optical axis of an image pickup optical system.

Here, although the shape variation of distortion due to the decentering of the vibration reduction optical system and the shape variation of distortion due to the displacement between the image center and the optical axis of the image pickup optical system are different in the principle of occurrence, these shape variations have generally similar characteristics. FIG. 5 is a view illustrating an example of the relationship between the shape variation of distortion due to the decentering of the vibration reduction optical system and the shape variation of distortion due to the displacement between the image center and the optical axis of the image pickup optical system. Here, in FIG. 5, for easier understanding of only the variation in distortion shape, it is assumed that the subject that is an object of photography is a subject of a lattice pattern. In addition, a left part of FIG. 5 illustrates distortion shapes in photographed images at times when the subject was photographed in the state in which the image pickup system (the image pickup apparatus in the state in which the image pickup optical system is mounted) was shifted by 0 mm in vertical, 0.05 mm in vertical and 0.1 mm in vertical and the imaging element was driven by 0 mm in vertical, 0.05 mm in vertical and 0.1 mm in vertical so as to correct image blurs due to the shifts of the image pickup system. A right part of FIG. 5 illustrates distortion shapes in photographed images at times when the subject was photographed in the state in which the image pickup system (the image pickup apparatus in the state in which the image pickup optical system is mounted) was shifted by 0 mm in vertical, 0.05 mm in vertical and 0.1 mm in vertical, which are the same conditions as in the left part of FIG. 5, and the vibration reduction optical system was driven by 0 mm in vertical, 0.05 mm in vertical and 0.1 mm in vertical so as to correct image blurs due to the shifts of the image pickup system. Incidentally, for the purpose of simple description, it is assumed that when the vibration reduction optical system was driven by 1 mm, the image on the image plane moves by 1 mm. Depending on the configuration of the vibration reduction optical system, a driving amount d of the vibration reduction optical system and a movement amount m on the image plane do not necessarily agree, and have a proportional relationship as indicated by equation (2) below. In FIG. 5, it is thought that an image plane movement sensitivity s in equation (2) is 1. At this time, a driving amount, which is necessary for suppressing the same blur, is equal between the imaging element and the vibration reduction optical system.

$$m = s \times d \quad \text{equation (2)}$$

$$\text{where } s = (1-\beta 2) \times \beta 3 \quad \text{equation (3)}$$

(β2: a magnification of the vibration reduction optical system, β3: a magnification of a group in rear of the vibration reduction optical system of the image pickup optical system).

As is understood from FIG. 5, even if distortion shapes in the states in which the imaging element and the vibration reduction optical system were driven by the same amount are compared, both distortion shapes do not agree. However, in the case of FIG. 5, distortion shapes in both the state, in which the vibration reduction optical system was driven by 0.05 mm, and the state, in which the imaging element was driven by 0.1 mm, are similar.

Accordingly, when a photographed image in a state in which the vibration reduction optical system was driven by 0.05 mm is to be corrected, if there is a "mechanism that can correct distortion, which occurs in point-symmetry with respect to a position where the optical axis of the image pickup is focused, by taking into account a displacement between the image center and the position where the optical axis of the image pickup is focused", such as equation (1), it should suffice if 0.1 mm is given to this mechanism as a displacement amount between the image center and the optical axis center. Thereby, it is possible to generally correct the shape variation of distortion (non-point-symmetrization of the distortion shape) due to the driving of the vibration reduction optical system.

In a concrete process, for example, a correlation between the driving amount of a vibration reduction optical system and the driving amount of an imaging element, which are similar in shape of distortion on an image plane, is predefined. When the vibration reduction optical system was driven, the driving amount of the vibration reduction optical system is converted to a corresponding driving amount of the imaging element. In accordance with the driving amount after the conversion, for example, distortion correction based on equation (1) is executed. FIG. 6A and FIG. 6B illustrate examples of the correlation between the driving amount of the vibration reduction optical system and the driving amount of the imaging element, which are similar in shape of distortion on the image plane. FIG. 6A is an example in which the correlation is linear. In the case of the linear correlation, when distortion correction is executed, conversion is executed by multiplying the driving amount of the vibration reduction optical system by a predetermined coefficient. On the other hand, FIG. 6B is an example in which the correlation is nonlinear. In the case of the nonlinear correlation, an approximate expression representing the curve of the nonlinear correlation is predefined. In addition, when distortion correction is executed, the driving amount of the vibration reduction optical system is converted by using the approximate expression. The relationship of FIG. 6B is approximated by, for example, a quadratic expression. However, it is not always necessary that the relationship of FIG. 6B be approximated by the quadratic expression. Although the relationship of FIG. 6B may be approximated by an equation of a proper degree, that is, a cubic equation or a higher-degree equation. In addition, the relationship may be approximated by a proper equation, aside from a polynomial expression.

Specifically, as described above, a function (reference position conversion function) is obtained, which indicates a correlation between the shape of distortion on the image plane of the imaging element, which corresponds to the driving amount of the vibration reduction optical system, and the shape of distortion on the image plane of the imaging element, which corresponds to the displacement amount between the optical axis of the image pickup optical system and the image center of the photographed image. By using this reference position conversion function, the driving amount of the vibration reduction optical system is converted to the driving amount of the imaging element. By using the converted result, distortion correction is executed. Thereby, the image pickup apparatus can execute distortion correction with high precision by the simple method.

[First Embodiment]

Figure 8:
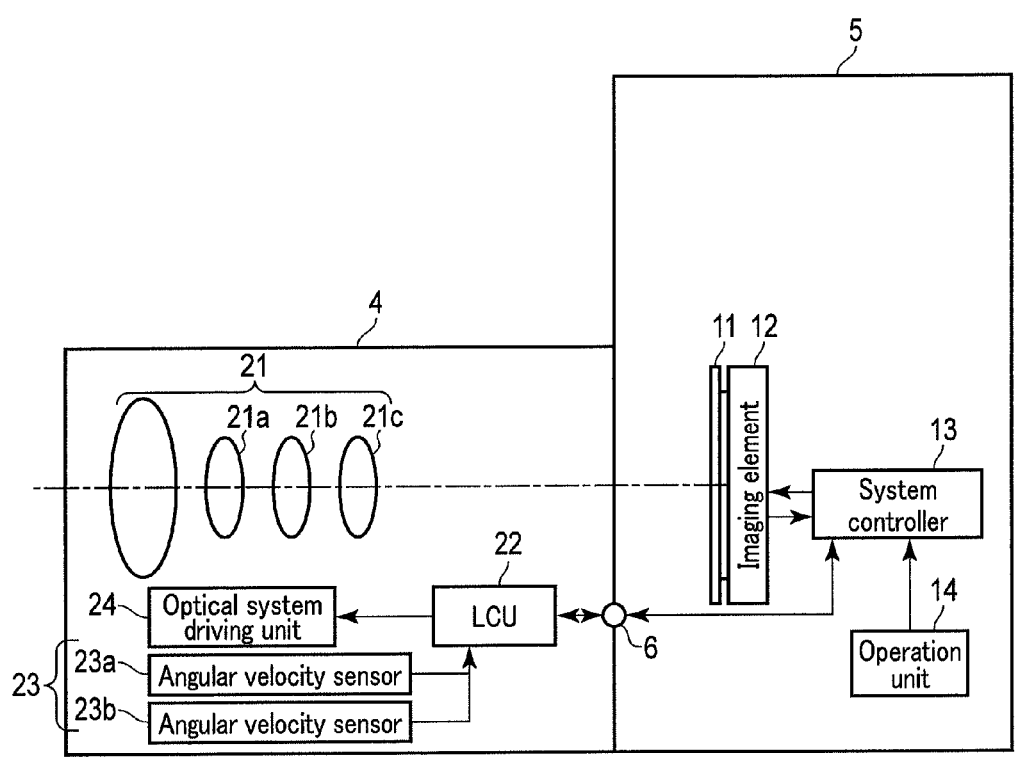
FIG. 8 is a view illustrating a configuration example of a control system of the image pickup system in the first embodiment.

FIG. 7 and FIG. 8 are views illustrating a configuration example of an image pickup system 3 according to a first embodiment. FIG. 7 is a view illustrating an external appearance of an interchangeable lens 4 and a camera body 5 of the image pickup system 3. FIG. 8 is a view illustrating a configuration example of a control system of the image pickup system 3. The image pickup system 3 includes the interchangeable lens 4 and camera body 5. The interchangeable lens 4 and camera body 5 are communicably connected via lens mounts 6. The lens mounts 6 are formed on the interchangeable lens 4 and camera body 5, respectively. By the lens mounts 6 being engaged, the interchangeable lens 4 and camera body 5 are fixed, and the interchangeable lens 4 and camera body 5 are connected in the communicable state.

In the description below, the left-and-right direction of the camera body 5 is defined as an X direction, and the up-and-down direction thereof is defined as a Y direction. The image plane of the imaging element 12 is formed in parallel to the X direction and Y direction. Here, the right direction in the X direction in a case where the camera body 5 is viewed from the subject side is defined as a (+) direction, and the left direction in this case is defined as a (−) direction. The upward direction in the Y direction is defined as a (+) direction, and the downward direction in the Y direction is defined as a (−) direction. In addition, the optical axis direction of the image pickup optical system 21 of the interchangeable lens 4 is defined as a Z direction. The subject side in the Z direction is defined as a (+) direction, and the side opposite to the subject side is defined as a (−) direction.

Furthermore, a rotational movement about the X direction, which is the horizontal direction of the imaging plane of the imaging element 12, is referred to as a pitch-directional rotational movement. A rotational movement about the Y direction, which is the vertical direction of the imaging plane, is referred to as a yaw-directional rotational movement. A rotational movement about the Z direction, which is the optical axis of the image pickup optical system 21, is referred to as a roll-directional rotational movement. Incidentally, the rotation in the direction of each arrow in FIG. 7 is referred to as a (+) directional rotation, and the rotation in the opposite direction is referred to a (−) directional rotation. The above-described relationship between the positive (+) and negative (−) is determined by the specifications of an angular velocity sensor 23, and this relationship may be reversed.

The interchangeable lens 4 is mounted on the camera body 5 via the lens mounts 6. When the interchangeable lens 4 was mounted on the camera body 5, the interchangeable lens 4 operates in accordance with the control of the camera body 5. The interchangeable lens 4 includes an image pickup optical system 21, a lens control unit (LCU) 22, angular velocity sensor 23, and an optical system driving unit 24.

The image pickup optical system 21 is an imaging lens which forms an image on the image plane. The image pickup optical system 21 forms an image of a light flux from a subject (not shown) onto the image plane of the imaging element 12 of the camera body 5. The image pickup optical system 21 includes, for example, an optical system (zooming optical system) 21a for varying a focal distance of the image pickup optical system 21, an optical system (focusing optical system) 21b for changing a focus state of the image by moving a focus position, and a vibration reduction optical system 21c which is driven in a direction perpendicular to the optical axis of the image pickup optical system 21.

The LCU 22 is a controller which includes, a processer for example a CPU (Central Processing Unit) and a memory, and controls the operation of the interchangeable lens 4. For example, the LCU 22 controls the driving of the lenses and aperture of the image pickup optical system 21 in accordance with an instruction from a system controller 13 of the camera body 5.

The LCU 22 stores in the memory the information (first lens information) which is indicative of optical characteristics of the image pickup optical system 21 of the interchangeable lens 4. The LCU 22 stores in the memory, for example, as the first lens information, a focal distance of the image pickup optical system 21, a position (zoom position) at which the zooming optical system 21a can be driven, a position (focus position) at which the focusing optical system 21b can be driven, distortion correction information for correcting distortion of the image pickup optical system 21, and a reference position conversion function. The distortion correction information and reference position conversion function are constituted, for example, for each of combinations between the zoom position and the focus position. The LCU 22 supplies the first lens information, which is stored in the memory, to the camera body 5 in accordance with an instruction from the system controller 13.

In addition, the LCU 22 recognizes the focus position, the zoom position, and the driving amount of the vibration reduction optical system 21c, and supplies the recognized information (second lens information) to the camera body 5.

The angular velocity sensor 23 detects, as an angular velocity signal, a rotational movement which occurs in accordance with the attitude of the interchangeable lens 4 that is mounted on the camera body 5. The angular velocity sensor 23 detects, for example, the above-described yaw-directional and pitch-directional rotational movements, and generates angular velocity signals. The angular velocity sensor 23 includes an angular velocity sensor 23a which detects the yaw-directional rotational movement, and an angular velocity sensor 23b which detects the pitch-directional rotational movement.

The optical system driving unit 24 drives the zooming optical system 21a, focusing optical system 21b and vibration reduction optical system 21c of the image pickup optical system 21 in accordance with the control of the LCU 22. The optical system driving unit 24 varies the focal distance of the image pickup optical system 21 by driving the zooming optical system 21a and changing the position of the zooming optical system 21a on the optical system. In addition, the optical system driving unit 24 changes the focus position of the image pickup optical system 21 by driving the focusing optical system 21b and changing the position of the focusing optical system 21b on the optical system. Furthermore, the optical system driving unit 24 suppresses image blur by changing the position of the image, which is formed on the image plane by the image pickup optical system 21, by driving the vibration reduction optical system 21c in the direction perpendicular to the optical axis. The optical system driving unit 24 functions as a blur correction actuator.

The LCU 22 functions as a blur amount acquisition unit (blur amount detection sensor) which calculates the blur amount of the image pickup system 3, based on the angular velocity signal detected by the angular velocity sensor 23. In the present embodiment, the LCU 22 calculates, based on the angular velocity signal, the blur amount of the image pickup optical system 21 as the blur amount of the image pickup system 3. Specifically, the blur amount is a yaw-directional rotational movement of the optical axis of the image pickup optical system 21, and a pitch-directional rotational movement of the optical axis of the image pickup optical system 21. Based on the blur amount and the optical characteristics of the image pickup optical system 21, the LCU 22 calculates the movement amount (displacement amount) of the image on the image plane. Based on the calculated displacement amount, the LCU 22 tells the driving amount of the vibration reduction optical system 21c to the optical system driving unit 24, and thereby the displacement of the image on the image plane can be canceled.

The camera body 5 includes a shutter 11, imaging element 12, system controller 13, and an operation unit 14.

The shutter 11 is a mechanism which is provided between the image pickup optical system 21 and imaging element 12, and adjusts the amount of light which passes through the image pickup optical system 21 and is incident on the imaging element 12. The shutter 11 is, for example, a focal plane shutter. The shutter 11 controls an exposure time which is a time in which light is incident on the imaging element 12, by opening/closing a shutter curtain.

The imaging element 12 is provided in rear of the image pickup optical system 21, that is, in the inner side of the housing of the camera body 5. The imaging element 12 includes an image plane which is composed such that a plurality of imaging pixels, which photoelectrically convert light and accumulate electric charge, are arranged. The imaging element 12 is composed of, for example, a complementary metal oxide semiconductor (CMOS) image sensor, or some other imaging element. The imaging element 12 converts an image (subject image), which is converged via the image pickup optical system 21 and formed on the image plane, to an electric signal corresponding to the light amount, thereby generating an image signal. The imaging element 12 supplies the image signal to the system controller 13 in accordance with a control signal from the system controller 13.

The system controller 13 is a controller which includes, a processor, for example a CPU and a memory, and controls the operation of the camera body 5. In addition, the system controller 13 includes a communication unit which communicates with the LCU 22 of the interchangeable lens 4 via the lens mounts 6. The communication unit is composed of, for example, a transmission circuit and a reception circuit. In addition, the communication unit transmits/receives control signals and information signals to/from the LCU 22 of the interchangeable lens 4, thereby controlling the operation of the interchangeable lens 4.

For example, the system controller 13 transmits, from the communication unit to the LCU 22 of the interchangeable lens 4, control signals of, for example, an instruction to drive the aperture for exposure adjustment, an instruction of the focus position, and an instruction of the zoom position. In addition, the system controller 13 executes control of image display on display means (not shown), recording of image files in a recording device (not shown), control to switch the operation mode in accordance with the operation of the operation unit 14, and control to start or end an imaging operation.

In addition, the system controller 13 reads out an image signal from the imaging element 12, executes signal processing on the read-out image signal, and acquires image data (photographed image). Further, the system controller 13 applies various signal processes to the photographed image. These signal processes include the above-described distortion correction. For this purpose, the system controller 13 acquires the above-described first lens information and second lens information by the reception circuit of the communication unit, and corrects the distortion, based on the acquired first lens information and second lens information.

The operation unit 14 includes operation members which are operated by a user. For example, the operation unit 14 includes, as the operation members, a release button and a movie recording button. The release button is a button for causing the camera body 5 to execute a still image photography process. In addition, the movie recording button is a button for causing the camera body 5 to execute a movie recording process. Besides, the operation unit 14 may include, as the operation member, a button for changing the operation mode of the camera body 5 or changing various settings such as exposure control. For example, the operation unit 14 may include, as the operation member, a button for changing the setting of execution/non-execution of distortion correction.

Figure 9:
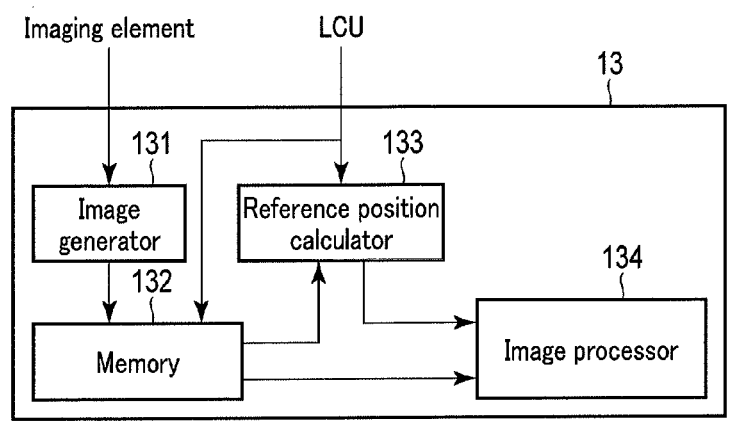
FIG. 9 is a block diagram illustrating, as blocks, functions which a system controller includes.

Next, a process in the inside of the system controller 13 will be described. FIG. 9 is a block diagram illustrating, as blocks, functions which the system controller 13 includes. The system controller 13 includes an image generator 131, a memory 132, a reference position calculator 133, and an image processor 134.

The image generator 131 converts an image signal, which was read from the imaging element 12, to image data (photographed image) which can be subjected to image processing. The image generator 131 supplies the converted image data to the memory 132.

The memory 132 is a storage area for storing data. The memory 132 stores image data which was supplied from the image generator 131. In addition, the memory 132 stores the above-described first lens information and second lens information.

The reference position calculator 133 calculates a displacement amount between the optical axis of the image pickup optical system 21 and the image center of the photographed image, based on the first lens information and second lens information stored in the memory 132. For example, the reference position calculator 133 recognizes the optical characteristics of the image pickup optical system 21 and the driving amount of the vibration reduction optical system 21c, based on the first lens information and second lens information. To be more specific, the reference position calculator 133 recognizes the focal distance of the image pickup optical system 21 and the driving amount of the vibration reduction optical system 21c, based on the first lens information and second lens information. The reference position calculator 133 calculates the above-described displacement amount, based on the recognized focal distance of the image pickup optical system 21 and the recognized driving amount of the vibration reduction optical system 21c.

Furthermore, the reference position calculator 133 converts the calculated displacement amount, based on the first lens information and second lens information. The reference position calculator 133 recognizes the focus position and zoom position of the image pickup optical system from the second lens information, and specifies one reference position conversion function from the first lens information in accordance with the recognized result. The reference position calculator 133 converts the above-described displacement amount by using the specified reference position conversion function, thereby calculating a converted displacement amount. Specifically, the reference position calculator 133 functions as a displacement amount conversion unit which calculates the displacement amount and converts the displacement amount. The reference position calculator 133 calculates a reference position for distortion correction in accordance with the calculated converted displacement amount.

For example, when the shape of distortion on the image plane, which corresponds to the driving amount of the vibration reduction optical system 21c, and the shape of distortion on the image plane, which corresponds to the displacement amount between the optical axis and the image center, have a relation of a linear function with a coefficient α, the reference position conversion function can be expressed by:

Converted displacement amount=displacement amount×α     equation (4)

The image processor 134 executes distortion correction of the photographed image, based on the first lens information and the reference position. For example, the image processor 134 executes distortion correction of the photographed image, based on the distortion correction information of the first lens information, with the reference position being set as the center of distortion correction.

As described above, the system controller 13 executes distortion correction, based on the converted displacement amount, which is calculated by converting, by the preset reference position conversion function, the displacement amount between the optical axis and the image center of the photographed image, the displacement amount being calculated based on the calculated focal distance of the image pickup optical system 21 and the calculated driving amount of the vibration reduction optical system 21c. Thereby, the system controller 13 can execute distortion correction by approximating the shape of distortion on the image plane, which corresponds to the driving amount of the vibration reduction optical system 21c, as the shape of distortion on the image plane, which corresponds to the displacement amount between the optical axis and the image center of the photographed image.

Figure 10:
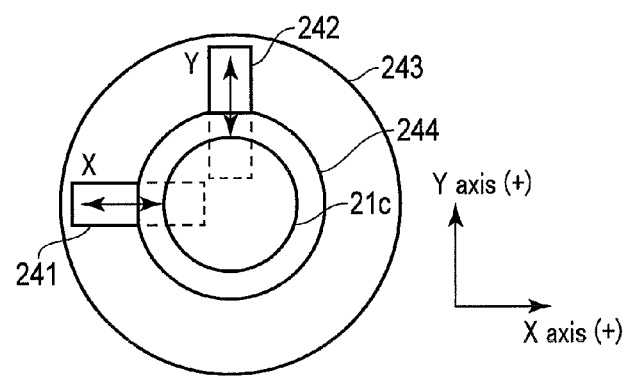
FIG. 10 is an explanatory view illustrating an example of a configuration for driving a vibration reduction optical system of an optical system driving unit.

Next, a process in the interchangeable lens 4 will be described. FIG. 10 is an explanatory view illustrating an example of a configuration for driving the vibration reduction optical system 21c of the optical system driving unit 24. The optical system driving unit 24 includes, for example, a movable unit 244 which operates in interlock with the vibration reduction optical system 21c; a support unit 243 which supports the movable unit 244; and an actuator 241 and an actuator 242 which drive the movable unit 244.

The actuator 241 and actuator 242 drive the movable unit 244 in directions perpendicular to the optical axis of the image pickup optical system 21 in accordance with the control of the LCU 22. Each of the actuator 241 and actuator 242 includes, for example, an electromagnetic linear motor (e.g. voice coil motor) which is composed of an electromagnetic coil provided in the movable unit 244, and a fixed magnet which is provided in the support unit 243 and is magnetically connected to the electromagnetic coil.

The actuator 241 and actuator 242 are configured to drive the movable unit 244 in directions perpendicular to the optical axis of the image pickup optical system 21, by an interaction of a magnetic field occurring between the electromagnetic coil and fixed magnet, when a driving current from the LCU 22, which corresponds to the driving amount of the vibration reduction optical system 21c (the movement amount and direction from the position where the optical axis of the image pickup optical system agrees with the optical axis of the vibration reduction optical system 21c), was caused to flow through the electromagnetic coil that constitutes the electromagnetic linear motor. For example, the actuator 241 is configured to drive the movable unit 244 in the X direction by the interaction of the magnetic field. In addition, for example, the actuator 242 is configured to drive the movable unit 244 in the Y direction by the interaction of the magnetic field.

FIG. 11 is a block diagram illustrating, as blocks, functions which the LCU 22 includes. The LCU 22 includes an analog-to-digital converter (ADC) 221a, an ADC 221b, a correction amount calculator 222a, a correction amount calculator 222b, a driving amount calculator 223, an actuation driver 224a, an actuation driver 224b, a memory 225, and a communication unit 226.

The ADC 221a converts a yaw-directional angular velocity signal, which is output from the angular velocity sensor 23a, to a digital value. The ADC 221b converts a pitch-directional angular velocity signal, which is output from the angular velocity sensor 23b, to a digital value.

The correction amount calculator 222a calculates a Y-directional image blur amount (displacement amount) occurring on the image plane, based on the yaw-directional angular velocity signal and the optical characteristics of the image pickup optical system 21. The correction amount calculator 222b calculates an X-directional image blur amount (displacement amount) occurring on the image plane, based on the pitch-directional angular velocity signal and the optical characteristics of the image pickup optical system 21. FIG. 12 is an explanatory view for explaining the operation of the correction amount calculator 222a and correction amount calculator 222b. Specifically, each of the correction amount calculator 222a and correction amount calculator 222b multiplies an input digital angular velocity signal by an optical characteristic OP corresponding to the focal distance of the image pickup optical system 21, and integrates the multiplied value, thereby calculating a displacement amount as a correction amount.

For example, when the focal distance is f and the correction sensitivity of the vibration reduction optical system 21c is K, the optical characteristic OP is expressed by:

$$\text{Optical characteristic } OP = f/K \qquad \text{equation (5)}$$

In order to use the optical characteristic OP for the calculation of the displacement amount, the LCU 22 detects the focal distance f by periodically detecting the zoom position of the image pickup optical system 21.

The correction sensitivity K is a ratio (variation ratio) of the displacement amount of the image on the image plane to the driving amount of the vibration reduction optical system 21c at a certain focal distance f.

In the correction in the interchangeable lens 4, the displacement amount of the image on the image plane of the imaging element 12 does not agree with the driving amount of the vibration reduction optical system 21c. Thus, using the above equation (5), the displacement amount of the image on the image plane is converted to the driving amount of the vibration reduction optical system 21c, based on the correction sensitivity K.

As described above, the correction amount calculator 222a calculates the Y-directional displacement amount occurring on the image plane, by multiplying the yaw-directional angular velocity by the optical characteristic OP. In addition, the correction amount calculator 222b calculates the X-directional displacement amount occurring on the image plane, by multiplying the pitch-directional angular velocity by the optical characteristic OP.

The driving amount calculator 223 calculates the X-directional and Y-directional driving amounts of the vibration reduction optical system 21c, based on the X-directional and Y-directional displacement amounts calculated by the correction amount calculator 222a and correction amount calculator 222b.

The actuation driver 224a outputs to the optical system driving unit 24 a driving pulse signal which has a current waveform corresponding to the X-directional driving amount of the vibration reduction optical system 21c. In addition, the actuation driver 224b outputs to the optical system driving unit 24 a driving pulse signal which has a current waveform corresponding to the Y-directional driving amount of the vibration reduction optical system 21c.

The memory 225 is a memory which stores the first lens information. For example, the memory 225 stores the focal distance of the image pickup optical system 21, the zoom position of the zooming optical system 21a, the focus position of the focusing optical system 21b, the distortion correction information for correcting distortion of the image pickup optical system 21, and the reference position conversion function. The memory 225 may additionally store the second lens information. For example, the memory 225 stores, as the second lens information, the present focus position and zoom position of the image pickup optical system 21, and the driving amount of the vibration reduction optical system 21c, which were recognized by the LCU 22.

The communication unit 226 communicates with the camera body 5 via the lens mounts 6. Thereby, the communication unit 226 receives, from the camera body 5, a notification of the start and end of blur correction by the vibration reduction optical system 21c, a control signal for exposure adjustment, an instruction of the focus position, and an instruction of the zoom position. The communication unit 226 transmits the first lens information and second lens information, for example, responding to a request from the system controller 13 of the camera body 5.

Next, a description will be given of the operation relating to distortion correction of the camera body 5 and interchangeable lens 4 of the image pickup system 3. FIG. 13 is a flowchart illustrating an example of the operation relating to distortion correction of the camera body 5 and interchangeable lens 4.

When the camera body 5 acquired a photographed image by the imaging element 12, the camera body 5 determines whether the distortion correction is effective or not. If the distortion correction is effective, the camera body 5 executes the distortion correction. The camera body 5 first determines whether the present time is immediately after the mounting of the interchangeable lens 4 (step S11). If the camera body 5 determines that the present time is immediately after the mounting of the interchangeable lens 4 (step S11, YES), the camera body 5 then receives and acquires the reference position conversion function from the interchangeable lens 4 (step S12).

Figures 14, 15:
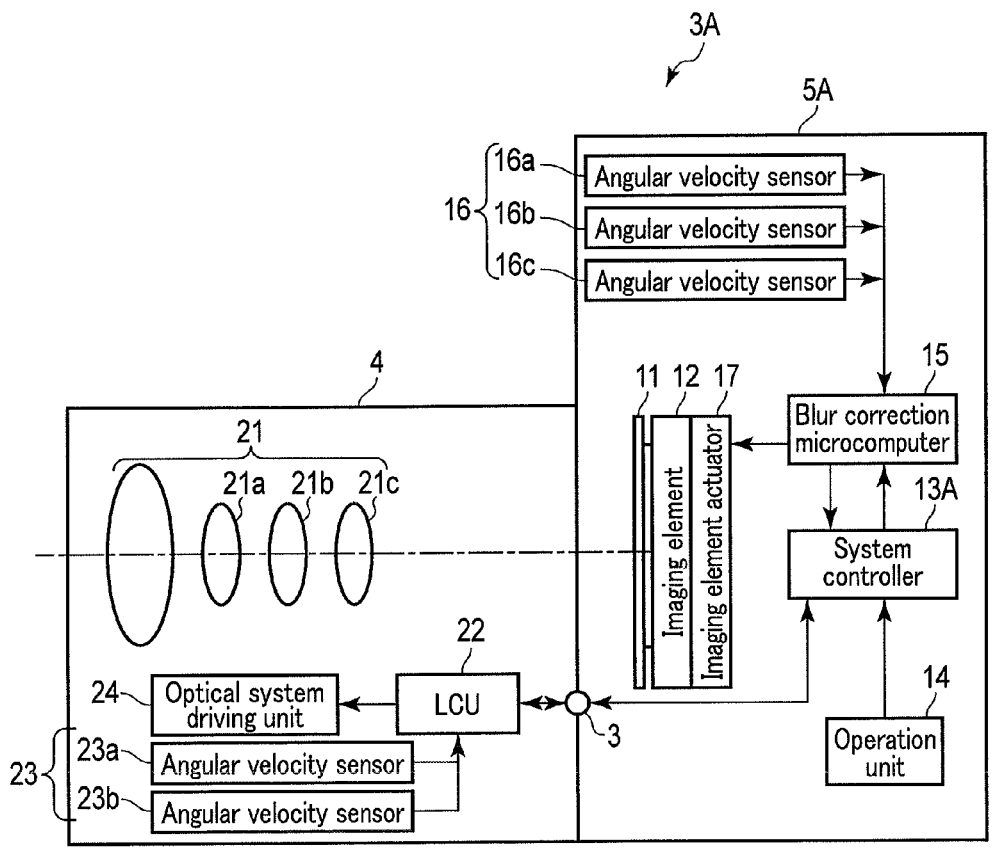
FIG. 14 is an explanatory view illustrating an example of a reference position conversion function.
FIG. 15 is a view illustrating a configuration of an image pickup system according to a second embodiment.

FIG. 14 is an explanatory view illustrating an example of the reference position conversion function. The reference position conversion function is a function which is set for each of combinations between the zoom position of the zooming optical system 21*a* and the focus position of the focusing optical system 21*b*. For example, the camera body 5 acquires from the interchangeable lens 4 the first lens information including the reference position conversion function. In addition, for example, the camera body 5 may request the interchangeable lens 4 to transmit the reference position conversion function. Incidentally, when the image pickup optical system 21 does not include the zooming optical system 21*a*, the reference position conversion function may be formed for each of focus positions.

In addition, if the camera body 5 determines that the present time is not immediately after the mounting of the interchangeable lens 4 (step S11, NO), the camera body 5 then goes to the process of step S13.

The camera body 5 determines whether camera shake correction in the interchangeable lens 4 is effective or not (step S13). For example, if the camera body 5 determines that the camera shake correction in the interchangeable lens 4 is effective, the camera body 5 may transmit a control signal to the interchangeable lens 4 so as to execute camera shake correction.

If the camera body 5 determines that the camera shake correction in the interchangeable lens 4 is effective (step S13, YES), the camera body 5 acquires the driving amount of the vibration reduction optical system 21*c*, the zoom position and the focus position from the interchangeable lens 4 (step S14). Specifically, the camera body 5 acquires the second lens information from the interchangeable lens 4. For example, the camera body 5 may request the interchangeable lens 4 to transmit the second lens information. In addition, if the camera body 5 determines that the camera shake correction in the interchangeable lens 4 is not effective (step S13, NO), the camera body 5 goes to the process of step S16.

The camera body 5 calculates a reference position, based on the acquired zoom position, focus position and driving amount of the vibration reduction optical system 21*c* (step S15). For example, based on the acquired zoom position and focus position, the camera body 5 specifies one reference position conversion function from among the reference position conversion functions for the respective combinations between the zoom position and focus position. In addition, the camera body 5 calculates a displacement amount, based on the driving amount of the vibration reduction optical system 21*c* and the zoom position (the focal distance of the image pickup optical system 21). Furthermore, the camera body 5 calculates a converted displacement amount by converting the displacement amount by the reference position conversion function. Based on the converted displacement amount, the camera body 5 calculates the reference position which is used for the distortion correction.

The camera body 5 executes distortion correction of the photographed image, based on the distortion correction information of the image pickup optical system 21 and the reference position that was calculated from the converted displacement (step S16). In the meantime, when the camera shake correction in the interchangeable lens 4 is effective, the camera body 5 executes the distortion correction by using the calculated reference position as a reference. On the other hand, when the camera shake correction in the interchangeable lens 4 is not effective, the camera body 5 executes the distortion correction by using, as a reference, the image formation position which exists on the image plane of the imaging element 12 and corresponds to the optical axis of the image pickup optical system 21.

The interchangeable lens 4 transmits the reference position conversion function to the camera body 5 (step S17). For example, the interchangeable lens 4 may be configured to transmit the reference position conversion function in response to a request for the reference position conversion function from the camera body 5, or may be configured to transmit the reference position conversion function when a connection to the camera body 5 was detected.

The interchangeable lens 4 detects the blur amount of the image pickup system 3, and calculates the driving amount of the vibration reduction optical system 21*c* (step S18). The interchangeable lens 4 drives the vibration reduction optical system 21*c* in accordance with the calculated driving amount. In the meantime, the interchangeable lens 4 may be configured to execute the process of step S18 when the interchangeable lens 4 received from the camera body 5 the control signal which instructs execution of the camera shake correction, or may be configured to calculate the driving amount of the vibration reduction optical system 21*c* regardless of the reception/non-reception of this control signal.

The interchangeable lens 4 detects the position of the zooming optical system 21*a* of the image pickup optical system 21 and the position of the focusing optical system 21*b* of the image pickup optical system 21, and acquires the zoom position and focus position (step S19). The interchangeable lens 4 generates the second lens information by the process of step S18 and step S19.

The interchangeable lens 4 transmits the driving amount of the vibration reduction optical system 21*c*, the zoom position and the focus position to the camera body 5 (step S20). Specifically, the interchangeable lens 4 transmits the second lens information to the camera body 5. For example, the interchangeable lens 4 may be configured to transmit the second lens information to the camera body 5 when the second lens information was requested by the camera body 5, or may be configured to periodically transmit the second lens information to the camera body 5. Thereby, the interchangeable lens 4 transmits the information which is necessary for the camera body 5 to execute the distortion correction.

The camera body 5 periodically executes the above step S11 to S16 while photographed images are being acquired. For example, the camera body 5 executes the series of process steps of the above step S11 to S16, each time a photographed image is acquired. Thereby, the camera body 5 can acquire the second lens information for each of the photographed images. As a result, the camera body 5 can acquire the information which is necessary for the distortion correction of each photographed image.

According to the above-described embodiment, the image pickup system 3 sets the reference position of distortion correction, based on the converted displacement amount, which is calculated by converting, by the preset reference position conversion function, the displacement amount between the optical axis and the image center of the photographed image, the displacement amount being calculated based on the calculated focal distance of the image pickup optical system 21 and the calculated driving amount of the vibration reduction optical system 21*c*, and the image pickup system 3 executes the distortion correction. Thereby, the image pickup system 3 can execute the distortion correction by approximating the shape of distortion on the image plane, which corresponds to the driving amount of the vibration reduction optical system 21c, as the shape of distortion on the image plane, which corresponds to the displacement amount between the optical axis and the image center of the photographed image. Specifically, the image pickup system 3 can execute, by the simple process, the distortion correction with consideration given to the shape of distortion on the image plane, which corresponds to the driving amount of the vibration reduction optical system 21c, and the shape of distortion on the image plane, which corresponds to the displacement amount between the optical axis and the image center of the photographed image.

In addition, according to the above-described embodiment, in the image pickup system 3, the camera body 5 acquires in advance the first lens information including the reference position conversion function for each of the combinations between the zoom position and focus position, and stores the first lens information in the memory 132, and the camera body 5 acquires, from the interchangeable lens 4, the second lens information including the zoom position, focus position and driving amount of the vibration reduction optical system 21c in accordance with the acquisition of the photographed image. Thereby, after acquiring the first lens information, the camera body 5 acquires the second lens information that is simple in structure, thus being able to execute proper distortion correction. Thereby, it is possible to reduce the communication capacity of the information which is necessary for executing the distortion correction between the camera body 5 and the interchangeable lens 4.

Moreover, according to the above-described configuration, it is possible to reduce, during photographing, the communication capacity of the information which is necessary for executing the distortion correction between the camera body 5 and the interchangeable lens 4. Thus, when images are successively acquired in such cases as movie recording or live view display, it is possible to prevent a processing delay due to a delay in communication between the interchangeable lens 4 and camera body 5.

In particular, the reference position conversion function varies from lens to lens. Thus, by providing the reference position conversion functions for lenses, the camera body 5 can acquire the information for executing proper distortion correction, no matter which kind of lens is mounted on the camera body 5. Moreover, since the camera body 5 is not required to store reference position conversion functions of all mountable lenses, the capacity of the memory that is used can be reduced.

[Second Embodiment]

Next, a second embodiment will be described. FIG. 15 is a view illustrating a configuration of an image pickup system 3A according to a second embodiment. Incidentally, the same structural parts as in the first embodiment are denoted by like reference numerals, and a detailed description thereof is omitted. The image pickup system 3A includes an interchangeable lens 4 and a camera body 5A. The camera body 5A includes a shutter 11, an imaging element 12, a system controller 13A, an operation unit 14, a blur correction microcomputer 15, an angular velocity sensor 16, and an imaging element actuator 17.

The blur correction microcomputer 15 is a microcomputer which executes control relating to an image blur suppression process. The blur correction microcomputer 15 functions as a blur amount acquisition unit which calculates a blur amount of the image pickup system 3, based on an angular velocity signal which was detected by the angular velocity sensor 16. In the present embodiment, the blur correction microcomputer 15 detects, based on the angular velocity signal, the blur amount of the camera body 5 as the blur amount of the image pickup system 3. Specifically, the blur amount is rotational movements in the yaw direction, pitch direction and roll direction. The blur correction microcomputer 15 calculates a displacement amount that is the amount of image blur occurring on the image plane of the imaging element 12, based on the detection result of the blur amount and the optical characteristics of the image pickup optical system 21, and calculates the driving amount of the imaging element 12 by the imaging element actuator 17 in accordance with the displacement amount. The blur correction microcomputer 15 corrects the image blur by controlling the imaging element actuator 17 in a manner to actuate the image plane of the imaging element 12 in such a direction as to cancel the calculated image blur.

The angular velocity sensor 16 detects, as an angular velocity signal, a rotational movement which occurs in accordance with the variation in attitude of the camera body 5A. The angular velocity sensor 16 generates, for example, angular velocity signals corresponding to rotational movements in the yaw directional, pitch directional and roll direction. The angular velocity sensor 16 includes an angular velocity sensor 16a which detects the yaw-directional rotational movement, an angular velocity sensor 16b which detects the pitch-directional rotational movement, and an angular velocity sensor 16c which detects the roll-directional rotational movement.

The imaging element actuator 17 moves the image plane of the imaging element 12 in a direction perpendicular to the optical axis of the image pickup optical system 21 in accordance with the control of the blur correction microcomputer 15, thereby correcting the image blur on the image plane, which occurs due to the variation in attitude of the camera body 15A.

FIG. 16 is a block diagram illustrating, as blocks, functions which the blur correction microcomputer 15 includes.

The blur correction microcomputer 15 includes an analog-to-digital converter (ADC) 151a, an ADC 151b, an ADC 151c, a correction amount calculator 152a, a correction amount calculator 152b, a correction amount calculator 152c, a driving amount calculator 153, an actuation driver 154a, an actuation driver 154b, an actuation driver 154c, and a communication unit 155.

The ADC 151a converts a yaw-directional angular velocity signal, which is output from the angular velocity sensor 16a, to a digital value. The ADC 151b converts a pitch-directional angular velocity signal, which is output from the angular velocity sensor 16b, to a digital value. The ADC 151c converts a roll-directional angular velocity signal, which is output from the angular velocity sensor 16c, to a digital value.

The correction amount calculator 152a calculates an Y-directional image blur amount (displacement amount) occurring on the image plane, based on the yaw-directional angular velocity signal and the optical characteristics of the image pickup optical system 21. The correction amount calculator 152b calculates a X-directional image blur amount (displacement amount) occurring on the image plane, based on the pitch-directional angular velocity signal and the optical characteristics of the image pickup optical system 21. FIG. 17 is an explanatory view for explaining the operation of the correction amount calculator 152a and correction amount calculator 152b. Specifically, each of the correction amount calculator 152a and correction amount calculator 152b multiplies an input digital angular velocity signal by an optical characteristic OP corresponding to the focal distance of the image pickup optical system 21, multiplies the multiplied value by a ratio of image blur correction (image blur correction ratio) in the camera body 5A, and integrates the multiplied value, thereby calculating a displacement amount as a correction amount.

The image blur correction ratio in the camera body 5A is indicative of a ratio of image blur correction of the camera body 5A relative to the interchangeable lens 4. The image blur correction ratio may be an arbitrary preset value such as 1:1, or may be set based on the performance of image blur correction in the interchangeable lens 4 (e.g. the maximum value of the driving amount of the vibration reduction optical system 21c) and the performance of image blur correction in the camera body 5A (e.g. the maximum value of the driving amount of the imaging element 12). When the image blur correction ratio is, for example, 1:1, each of the correction amount calculator 152a and correction amount calculator 152b multiplies, by ½ as the image blur correction ratio, the value which was obtained by multiplying the angular velocity by the optical characteristic OP.

The correction amount calculator 152c calculates a roll-directional image blur amount (displacement amount) occurring on the image plane, based on the roll-directional angular velocity signal. FIG. 18 is an explanatory view for explaining an operation of the correction amount calculator 152c. Specifically, the correction amount calculator 152c calculates the displacement amount as the correction amount, by integrating the angular velocity which is indicated by the input roll-directional digital angular velocity signal.

The driving amount calculator 153 calculates the driving amount of the imaging element 12 by the imaging element actuator 17, based on the displacement amounts calculated by the correction amount calculator 152a, correction amount calculator 152b and correction amount calculator 152c. Specifically, the driving amount calculator 153 calculates the X-directional and Y-directional driving amounts of the imaging element 12 by the imaging element actuator 17, based on the X-directional and Y-directional displacement amounts calculated by the correction amount calculator 152a and correction amount calculator 152b. In addition, the driving amount calculator 153 calculates the roll-directional driving amount of the imaging element 12 by the imaging element actuator 17, based on the roll-directional displacement amount calculated by the correction amount calculator 152c.

The actuation driver 154a outputs to the imaging element actuator 17 a driving pulse signal which has a current waveform corresponding to the X-directional driving amount of the imaging element 12 by the imaging element actuator 17. The actuation driver 154b outputs to the imaging element actuator 17 a driving pulse signal which has a current waveform corresponding to the Y-directional driving amount of the imaging element 12 by the imaging element actuator 17. The actuation driver 154c outputs to the imaging element actuator 17 a driving pulse signal which has a current waveform corresponding to the roll-directional driving amount of the imaging element 12 by the imaging element actuator 17.

The communication unit 155 communicates with the system controller 13A, and acquires the optical characteristics of the image pickup optical system 21. In addition, the communication unit 155 communicates with the system controller 13A, and acquires a control signal which instructs the start and end of image blur correction.

Figure 19:
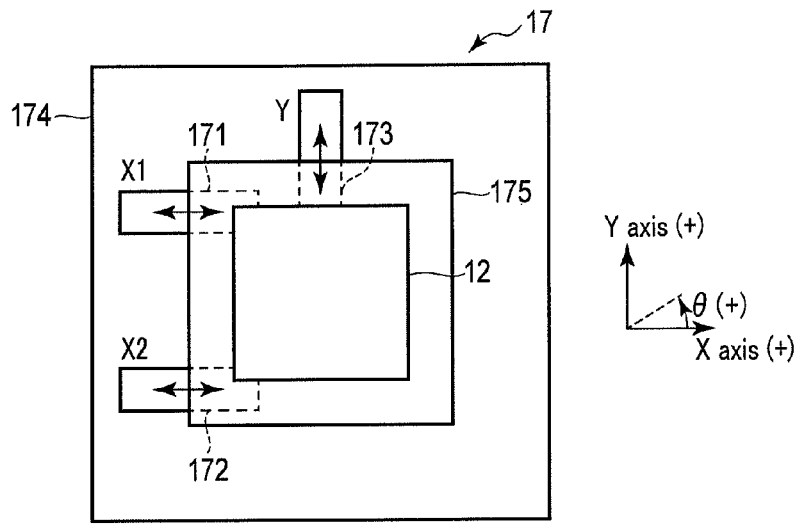
FIG. 19 is an explanatory view for explaining an example of a configuration of an imaging element actuator for actuating an imaging element.

Next, a process in the imaging element actuator 17 will be described. FIG. 19 is an explanatory view for explaining an example of the configuration of the imaging element actuator 17 for actuating the imaging element 12. The imaging element actuator 17 includes, for example, a movable unit 175 which operates in interlock with the imaging element 12; a support unit 174 which supports the movable unit 175; and an actuator 171, an actuator 172 and an actuator 173 which drive the movable unit 175.

The actuator 171 and actuator 172 drive the movable unit 175 in the X direction. The actuator 173 drives the movable unit 175 in the Y direction. The actuator 171 and actuator 172 drive the movable unit 175 in the roll direction by a difference in driving amount between the actuator 171 and actuator 172. Specifically, the actuator 171 and actuator 172 drive the movable unit 175 in the X direction and in the roll direction in accordance with the driving amount in the X direction and the driving amount in the roll direction. The actuator 173 drives the movable unit 175 in the Y direction in accordance with the driving amount in the Y direction.

Each of the actuator 171, actuator 172 and actuator 173 includes, for example, an electromagnetic linear motor (e.g. voice coil motor) which is composed of an electromagnetic coil provided in the movable unit 175, and a fixed magnet which is provided in the support unit 174 and is magnetically connected to the electromagnetic coil.

The actuator 171, actuator 172 and actuator 173 are configured to drive the movable unit 175 in the X direction, Y direction and roll direction by an interaction of a magnetic field occurring between the electromagnetic coil and fixed magnet, when a driving current from the blur correction microcomputer 15, which corresponds to the driving amount of the imaging element 12, was caused to flow through the electromagnetic coil that constitutes the electromagnetic linear motor.

The roll-directional driving amount (rotational movement angle) for the imaging element 12 is expressed by the equation below, if the rotational movement angle is a small value.

$$\text{Rotational movement angle} = L \cdot (\text{movement amount of actuator 172} - \text{movement amount of actuator 171}) \quad \text{equation (7)}$$

where L is a constant which is determined by the arrangement of the actuator 171 and actuator 172 relative to the movable unit 175.

Figure 20:
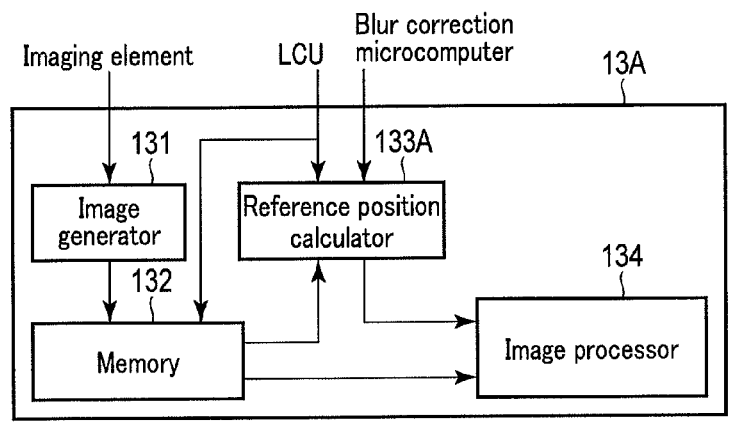
FIG. 20 is a block diagram illustrating, as blocks, functions which a system controller according to the second embodiment includes.

Next, a process in the system controller 13A will be described. FIG. 20 is a block diagram illustrating, as blocks, functions which the system controller 13A includes. The system controller 13A includes an image generator 131, a memory 132, a reference position calculator 133A, and an image processor 134.

In addition, the system controller 13A includes a communication unit which is composed of a transmission circuit and a reception circuit. The communication unit executes an operation of transmitting and receiving control signals and information signals between the system controller 13A and the LCU 22 of the interchangeable lens 4 via the lens mounts 6, and an operation of transmitting/receiving control signals and information signals to/from the communication unit 155 in the blur correction microcomputer 15. The reference position calculator 133A calculates a reference position from the reference position conversion function stored in the memory 132, and the image movement amount on the image plane, which corresponds to the driving amount of the imaging element actuator 17.

As described above, in the present embodiment, the image blur correction is executed in a divided manner between the camera body 5A and interchangeable lens 4 at a ratio corresponding to the image blur correction ratio. Thus, in order to calculate the reference position, the correction amounts (driving amounts) of both the imaging element actuator 17 and the optical system driving unit 24 are needed. However, the correction amount of the imaging element actuator 17 and the correction amount of the optical system driving unit 24 are determined by the image blur correction ratio. Thus, if one of these correction amounts can be calculated, the other correction amount can be estimated.

For example, if the image blur correction ratio is 1:1, the reference position calculator 133A calculates the reference position, based on the following equation:

Reference position=driving amount of imaging element actuator 17+driving amount of imaging element actuator 17×α  equation (8)

Specifically, the reference position calculator 133A calculates the reference position, based on the sum between the driving amount of the imaging element actuator 17 and the estimated driving amount of the vibration reduction optical system 21c.

Figure 21:
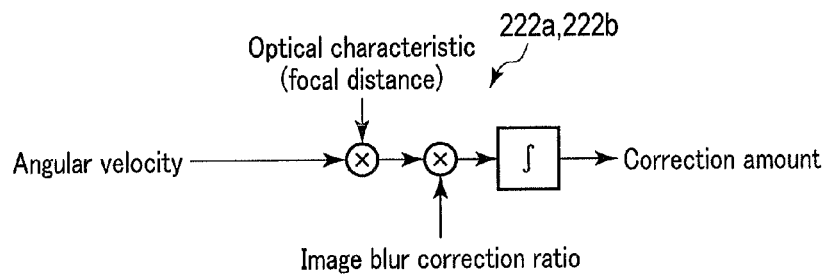
FIG. 21 is an explanatory view for explaining an operation of a correction amount calculator in an LCU according to the second embodiment.

In addition, as regards the LCU 22, the configuration of the correction amount calculators 222a and 222b in the LCU 22 is different from that in the first embodiment. FIG. 21 is an explanatory view for explaining the operation of the correction amount calculators 222a and 222b in the LCU 22 according to the second embodiment. Each of the correction amount calculators 222a and 222b in the second embodiment multiplies an angular velocity by an optical characteristic OP corresponding to the focal distance of the image pickup optical system 21, multiplies the multiplied value by the ratio of image blur correction (image blur correction ratio) in the interchangeable lens 4, and integrates the multiplied value, thereby calculating a displacement amount as a correction amount. For this purpose, the LCU 22 acquires the image blur correction ratio in the interchangeable lens 4 from the system controller 13.

Next, a description will be given of the operation relating to distortion correction of the camera body 5A and interchangeable lens 4 of the image pickup system 3A according to the second embodiment. FIG. 22 is a flowchart illustrating an example of the operation relating to distortion correction of the camera body 5A and interchangeable lens 4. Incidentally, since the processes of step S31 to step S33 correspond to step S11 to step S13 in FIG. 13, a description thereof is omitted.

If the camera body 5A determines that the camera shake correction in the interchangeable lens 4 is effective (step S33, YES), the camera body 5A acquires the driving amount of the imaging element actuator 17, based on the angular velocity detected by the angular velocity sensor 16, and estimates the driving amount of the vibration reduction optical system 21c, based on the driving amount of the imaging element actuator 17 and the image blur correction ratio between the camera body 5A and interchangeable lens 4 (step S34). Further, the camera body 5A drives the imaging element 12 by the imaging element actuator 17 in accordance with the calculated driving amount.

The camera body 5A acquires the zoom position and the focus position from the interchangeable lens 4 (step S35).

The camera body 5A calculates a reference position, based on the acquired zoom position, focus position and driving amount of the imaging element actuator 17, and the estimated driving amount of the vibration reduction optical system 21c (step S36).

The camera body 5A executes distortion correction of the photographed image, based on the distortion correction information of the image pickup optical system 21 and the reference position (step S37).

The interchangeable lens 4 transmits the reference position conversion function to the camera body 5A (step S38).

The interchangeable lens 4 detects the blur amount of the image pickup system 3, and calculates the driving amount of the vibration reduction optical system 21c (step S39). The interchangeable lens 4 drives the vibration reduction optical system 21c in accordance with the calculated driving amount.

The interchangeable lens 4 detects the position of the zooming optical system 21a of the image pickup optical system 21 and the position of the focusing optical system 21b of the image pickup optical system 21, and acquires the zoom position and focus position (step S40).

The interchangeable lens 4 transmits the zoom position and the focus position to the camera body 5A (step S41). The camera body 5A periodically executes the above step S31 to S37 while photographed images are being acquired. For example, the camera body 5A executes the above step S31 to S37, each time a photographed image is acquired. Thereby, the camera body 5A can acquire the second lens information for each of the photographed images. As a result, the camera body 5A can acquire the information which is necessary for the distortion correction of each photographed image. In the meantime, the camera body 5A may be configured to acquire the first lens information from the interchangeable lens 4 at a time of first communication after the connection to the interchangeable lens 4, to periodically acquire the second lens information from the interchangeable lens 4, and to convert the displacement amount between the optical axis and the image center of the photographed image by using the reference position conversion function, each time the photographed image is acquired by the imaging element 12, thereby calculating the converted displacement amount.

According to the above-described second embodiment, in the image pickup system 3A, the camera body 5A does not acquire the driving amount of the vibration reduction optical system 21c from the interchangeable lens 4. Instead, the camera body 5A estimates the driving amount of the vibration reduction optical system 21c, based on the driving amount of the imaging element actuator 17, which the camera body 5A calculated, and the correction ratio between the camera body 5A and interchangeable lens 4. Thereby, the communication amount between the camera body 5A and interchangeable lens 4 can be reduced, and the distortion correction with high precision can be executed.

In the meantime, in the above-described second embodiment, the camera body 5A acquires the first lens information from the interchangeable lens 4, but the restriction to this configuration is unnecessary. The camera body 5A may include a communication unit which is connected to a network, and may be configured to acquire the first lens information by this communication unit from a server which is connectable via the network. In addition, the camera body 5A may be configured to prestore the first lens information of a plurality of interchangeable lenses 4 in the memory 132.

Additionally, in the second embodiment, the description was given of the example in which the camera body 5A includes the imaging element actuator 17 which drives the imaging element 12, but the restriction to this configuration is unnecessary. The imaging element actuator 17 of the camera body 5A may be replaced with an electronic-type blur correction function which moves an area (cropping range) for photographing an image on the image plane of the imaging element 12 in accordance with the displacement amount. Moreover, the camera body 5A may be configured to execute, in combination, the blur correction by the imaging element actuator 17 and the electronic-type blur correction.

Additionally, in the above-described second embodiment, the interchangeable lens 4 is configured to include the angular velocity sensor 23, but the restriction to this is unnecessary. The interchangeable lens 4 in the second embodiment may be configured to acquire the displacement amount from the camera body 5A. According to this configuration, the angular velocity sensor 23 in the interchangeable lens 4 can be omitted.

Additionally, in the above-described second embodiment, such a configuration may be adopted that the correction in the interchangeable lens 4 and the correction by the camera body 5A are separately applied with respect to frequency components. For example, in the case of the configuration in which the correction in the interchangeable lens 4 is effective for the blur occurring at a high frequency, and the correction in the camera body 5A is effective for the blur occurring at a low frequency, the blur of the high frequency is corrected by the interchangeable lens 4, and the blur of the low frequency is corrected by the camera body 5A. Thereby, a more appropriate blur correction can be executed. Incidentally, how to allocate frequency components to the correction by the interchangeable lens 4 and to the correction by the camera body 5A may be determined when the interchangeable lens 4 and the camera body 5A are first connected, or, in other configuration, may be changed by a judgement at each time.

Although the present invention was described based on the embodiments, the invention is not restricted to the above embodiments. Needless to say, various modifications and applications may be made without departing from the spirit of the invention. In addition, in the above descriptions of the operational flowcharts, the operations are described by using such words as "first" or "then" for convenience' sake, but this does not mean that it is indispensable to execute the operations in the described order.

Furthermore, each of the processes by the above embodiments may be stored as a program which can be executed by a CPU or the like serving as a computer. Besides, the program may be stored in a storage medium of an external storage device, such as a memory card, a magnetic disk, an optical disc or a semiconductor memory, and may be distributed. In addition, the CPU or the like reads in the program stored in the storage medium of the external storage device, and can execute the above-described process by the operation of the CPU or the like being controlled by the read-in program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A camera system comprising:
   an interchangeable lens comprising:
      an image pickup optical system configured to form an image on an image plane,
      a vibration reduction optical system which is driven in a direction perpendicular to an optical axis of the image pickup optical system,
      a blur amount detection sensor configured to acquire a blur amount caused by a vibration of the camera system, and
      a blur correction actuator configured to drive the vibration reduction optical system by a driving distance based on the blur amount, and
   a camera body on which the interchangeable lens is mounted comprising:
      an image sensor configured to acquire a photograph of the image formed by the image pickup optical system, and
      a reception circuit configured to:
         acquire first lens information including distortion correction information for correcting distortion of the image pickup optical system,
         calculate a displacement between the optical axis and an image center of the photograph of the image to determine a shape of distortion of the image plane, and
         select a function indicating a correlation between the shape of distortion on the image plane and the driving distance of the vibration reduction optical system, and
      a processor configured to:
         calculate a converted displacement for the displacement based on the function, and
         execute distortion correction on the photograph of the image based on the first lens information and the converted displacement.

2. The camera system of claim 1, wherein the reception circuit is further configured to:
   acquire, from the interchangeable lens, second lens information including the driving distance of the vibration reduction optical system, and
   the processor is further configured to calculate the displacement, based on the driving distance acquired.

3. The camera system of claim 2, wherein the interchangeable lens further comprises a memory which stores the first lens information,
   wherein the reception circuit is configured to acquire the first lens information from the interchangeable lens.

4. The camera system of claim 3, wherein the reception circuit is further configured to acquire the first lens information from the interchangeable lens at a time of first communication after the camera body is connected to the interchangeable lens, and to periodically acquire the second lens information from the interchangeable lens.

5. The camera system of claim 3, wherein the reception circuit is configured to acquire the first lens information from an external device via an information communication network, and to periodically acquire the second lens information from the interchangeable lens.

6. The camera system of claim 2, wherein the reception circuit is configured to periodically acquire the second lens information from the interchangeable lens, while the photograph of the image is being acquired by the image sensor.

7. The camera system of claim 2, wherein the reception circuit is configured to periodically acquire the second lens information from the interchangeable lens, when the photograph of the image is acquired by the image sensor.

8. The camera system of claim 1, wherein the function included in the first lens information is a function of such a form that the converted displacement is calculated by multiplying the driving distance of the vibration reduction optical system by a coefficient which is a fixed constant, and
   the processor is configured to calculate the converted displacement by multiplying the displacement between the optical axis and the image center of the photograph of the image by the coefficient.

9. The camera system of claim 1, wherein the function included in the first lens information is an approximate expression which approximates a shape variation of distortion based on a decentering movement amount of the vibration reduction optical system by a shape variation of distortion based on the displacement between the optical axis and the image center.

10. The camera system of claim 2, wherein the image pickup optical system includes a zooming optical system configured to vary a focal distance, and a focusing optical system configured to change a focus state of an image,
the first lens information includes the function for each of combinations between a zoom position and a focus position,
the second lens information further includes a zoom position and a focus position of the image pickup optical system, and
the processer further selects the function, based on the zoom position and the focus position.

11. The camera system of claim 10, wherein the reception circuit is further configured to:
acquire the first lens information from the interchangeable lens at a time of first communication after the camera body is connected to the interchangeable lens, and to periodically acquire the second lens information from the interchangeable lens, and
the processer is configured to convert the displacement between the optical axis and the image center of the photograph of the image by using the function, and to calculate the converted displacement, each time the photograph of the image is acquired by the image sensor.

12. The camera system of claim 1, wherein the camera body further comprises an imaging element actuator configured to drive the image sensor in a direction perpendicular to the optical axis by a driving amount corresponding to the blur amount, and
the processer is configured to estimate the driving amount of the vibration reduction optical system in accordance with a ratio in correction amount between the vibration reduction optical system and the imaging element actuator, and a driving amount of the imaging element actuator.

13. The camera system of claim 12, wherein the converted displacement is a sum between the driving amount of the imaging element actuator and a value which is obtained by converting the estimated driving amount of the vibration reduction optical system by the function included in the first lens information.

14. The camera system of claim 13, wherein the image pickup optical system includes a zooming optical system configured to vary a focal distance, and a focusing optical system configured to change a focus state of an image,
the first lens information includes the function for each of combinations between a zoom position and a focus position, and
the reception circuit is configured to acquire second lens information including a zoom position and a focus position of the image pickup optical system from the interchangeable lens.

15. A camera body comprising:
a lens mount on which an interchangeable lens is mounted;
an image sensor configured to acquire a photograph of an image formed in an image plane of an image pickup optical system of the interchangeable lens, wherein the image pickup optical system has an optical axis;
a reception circuit configured to:
acquire lens information including distortion correction information for correcting distortion of the image pickup optical system,
calculate a displacement between the optical axis and an image center of the photograph of the image to determine a shape of distortion of the image plane, and
select a function indicating a correlation between a shape of distortion on the image plane and a driving amount of a vibration reduction optical system of the interchangeable lens, wherein the vibration reduction optical system reduces an amount of blurring caused by vibration of the camera body, and
a processor communicatively coupled to the reception circuit, wherein the processor is configured to:
calculate a converted displacement amount for the displacement based on the function, and
execute distortion correction on the photograph of the image, based on the distortion correction information and the converted displacement amount.

16. A control method of a camera system that has an interchangeable lens and a camera body on which the interchangeable lens is mounted, wherein the interchangeable lens comprises an image pickup optical system and a vibration reduction optical system, the control method comprising:
acquiring a blur amount caused by a vibration of the camera system;
driving, by a blur correction actuator, the vibration reduction optical system a driving distance based on the blur amount, wherein the driving distance is in a direction perpendicular to an optical axis of the camera system;
acquiring, by an image sensor of the camera body, a photograph of an image formed on an image plane of the image pickup optical system;
acquiring, by a processor of the camera body, first lens information including distortion correction information for correcting distortion of the image pickup optical system;
calculating, by the processor, a displacement between the optical axis and an image center of the photograph of the image to determine a shape of distortion of the image plane;
selecting a function indicating a correlation between the shape of distortion on the image plane and the driving distance of the vibration reduction optical system;
calculating a converted displacement for the displacement based on the function; and
executing, by the processor, distortion correction on the photograph of the image, based on the distortion correction information and the converted displacement.

* * * * *